(12) United States Patent
Sinyavskiy et al.

(10) Patent No.: US 11,691,286 B2
(45) Date of Patent: *Jul. 4, 2023

(54) SYSTEMS AND METHODS FOR ASSISTING A ROBOTIC APPARATUS

(71) Applicant: Brain Corporation, San Diego, CA (US)

(72) Inventors: Oleg Sinyavskiy, San Diego, CA (US); Jean-Baptiste Passot, Solana Beach, CA (US); Borja Ibarz Gabardos, London (GB); Diana Vu Le, San Diego, CA (US)

(73) Assignee: Brain Corporation, San Diego, CA (US)

( * ) Notice: Subject to any disclaimer, the term of this patent is extended or adjusted under 35 U.S.C. 154(b) by 876 days.

This patent is subject to a terminal disclaimer.

(21) Appl. No.: 16/454,695

(22) Filed: Jun. 27, 2019

(65) Prior Publication Data
US 2019/0381663 A1  Dec. 19, 2019

Related U.S. Application Data

(63) Continuation of application No. 15/423,442, filed on Feb. 2, 2017, now Pat. No. 10,377,040.

(51) Int. Cl.
*B25J 9/16* (2006.01)
*G05D 1/02* (2020.01)
*G05D 1/00* (2006.01)

(52) U.S. Cl.
CPC .......... *B25J 9/1666* (2013.01); *G05D 1/0044* (2013.01); *G05D 1/0274* (2013.01);
(Continued)

(58) Field of Classification Search
CPC ... B25J 9/1666; G05D 1/0044; G05D 1/0274; G05D 2201/0203; G05B 2219/39082; A47L 11/4011
See application file for complete search history.

(56) References Cited

U.S. PATENT DOCUMENTS

2012/0313779 A1  12/2012  Papaefstathiou et al.
2013/0056032 A1   3/2013  Choe et al.
(Continued)

FOREIGN PATENT DOCUMENTS

CN   103251358 A  *  8/2013  .......... A47L 11/4011
JP   H09-160646 A    6/1997
(Continued)

OTHER PUBLICATIONS

Teng et al. English Translation CN 103251358 (Year: 2013).*
(Continued)

*Primary Examiner* — Rachid Bendidi
(74) *Attorney, Agent, or Firm* — Reed Smith LLP; Sidharth Kapoor

(57) ABSTRACT

Systems and methods assisting a robotic apparatus are disclosed. In some exemplary implementations, a robot can encounter situations where the robot cannot proceed and/or does not know with a high degree of certainty it can proceed. Accordingly, the robot can determine that it has encountered an error and/or assist event. In some exemplary implementations, the robot can receive assistance from an operator and/or attempt to resolve the issue itself. In some cases, the robot can be configured to delay actions in order to allow resolution of the error and/or assist event.

18 Claims, 13 Drawing Sheets

(52) U.S. Cl.
CPC .............. *G05B 2219/39082* (2013.01); *G05D 2201/0203* (2013.01)

(56) References Cited

U.S. PATENT DOCUMENTS

| | | |
|---|---|---|
| 2015/0019043 A1 | 1/2015 | Creasey et al. |
| 2015/0224640 A1* | 8/2015 | Vu .......................... G06N 3/008 901/1 |
| 2016/0052133 A1 | 2/2016 | Kim et al. |
| 2018/0185998 A1* | 7/2018 | Browning ............... B60L 50/53 |

FOREIGN PATENT DOCUMENTS

| | | |
|---|---|---|
| JP | H09-266871 A | 10/1997 |
| JP | 2002-209035 A | 7/2002 |
| JP | 2014-071845 A | 4/2014 |
| JP | 201867785 * | 10/2016 |
| WO | 2015183005 A1 | 12/2015 |

OTHER PUBLICATIONS

English Translation JP2018067785 (Year: 2016).*
File wrapper of parent U.S. Appl. No. 15/423,442, filed Feb. 2, 2017, now U.S. Pat. No. 10,377,040.
International Search Report and Written Opinion for PCT/US18/11624.

* cited by examiner

SYSTEMS AND METHODS FOR ASSISTING A ROBOTIC APPARATUS

CROSS-REFERENCE AND RELATED APPLICATIONS

This application is a continuation of U.S. patent application Ser. No. 15/423,442, filed Feb. 2, 2017, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for assisting a robotic apparatus.

Background

In some cases, robots can operate autonomously with little to no direct operator control. However, while these robots operate autonomously, these robots can run into situations where they can get stuck and/or have errors and/or cannot proceed because of external causes (e.g., blocked paths).

Many contemporary robots work in controlled environments with little connectivity and monitoring. Accordingly, operators often do not know the needs of the robots and the robots do not have robust procedures to ask for help. In some cases, this can lead to the robots causing damage and/or other sub-optimal behavior of the robots. Moreover, in some cases, robots follow procedures for recovery that may even hamper the ability of operators to assist them. Accordingly, there is a need for improved systems and methods for assisting a robot.

SUMMARY

The foregoing needs are satisfied by the present disclosure, which provides for, inter alia, apparatus and methods for dynamic route planning in autonomous navigation. Example implementations described herein have innovative features, no single one of which is indispensable or solely responsible for their desirable attributes. Without limiting the scope of the claims, some of the advantageous features will now be summarized.

In a first aspect, a method for operating a robot is disclosed. In one exemplary implementation, the method includes: causing the robot to perform a task in an environment; generating data about the environment with one or more sensors of the robot as the robot performs the task; determining from the data that the robot is at least partially obstructed from performing the task; displaying a first alert indicating at least in part that the robot cannot continue the task after a predetermined first delay after the determination that the robot is at least partially obstructed; attempting to cause the robot to perform the task after a predetermined second delay after displaying the alert; and displaying a second alert indicating at least in part that the robot is at least partially obstructed after a predetermined third delay after the attempting to cause the robot to perform the task.

In one variant, the task comprises cleaning a floor. In another variant, the method comprises receiving operating instructions from an operator and continuing the performance of the task based at least in part on the operating instructions. In another variant, receiving operating instructions from the operator comprises receiving a determination that a button of the robot has been pushed, wherein the pushing of the button is an instruction to proceed performing the task notwithstanding the obstacle. In another variant, receiving operating instructions from the operator comprises displaying paths of travel and receiving a selection of the displayed paths.

In another variant, the method further comprises receiving data from an external sensor, and based at least in part on the data from the external sensor, determining if the robot is still at least partially obstructed from performing the task. In another variant, the method further comprises identifying that the robot is at least partially obstructed through object recognition.

In a second aspect, a robot is disclosed. In one exemplary implementation, the robot includes: one or more sensors configured to generate sensor data about an environment; one or more actuators configured to perform a first robotic task; a user interface configured to display and receive information; and a processor configured to: cause the one or more actuators to perform the first robotic task; detect, based at least in part on the sensor data, an obstacle while performing the first robotic task; actuate the one or more actuators so that the robot is not performing the first robotic task in response to, at least in part, the detected obstacle; display on the user interface an assist view comprising an alert indicative at least in part of the detected obstacle and one or more selectable positions of the robot; receive through the user interface a selected one of the one or more selectable positions of the robot; and actuate the actuators based at least in part on a selected one of the one or more selectable positions of the robot, and continue performing a task substantially similar to the first robotic task.

In one variant, the robot further comprises a communications unit communicatively coupled to a remote network configured to monitor the robot. In another variant, the processor is further configured to identify the obstacle. In another variant, the processor is further configured to learn to identify the obstacle through a machine learning process. In another variant, the robot comprises a floor cleaner. In another variant, the robotic task is navigation. In another variant, the selectable positions of the robot comprise trajectories of the robot.

In a third aspect, a method for assisting a floor cleaning robot is disclosed. In one exemplary implementation, the method comprises: displaying an assist view graphically representing that the floor cleaning robot is obstructed from cleaning; receiving operating instructions through the assist view, the operating instructions comprising displaying a plurality of paths of travel for the robot on a user interface, and receiving a selection of the displayed paths; and causing the floor cleaning robot to clean in accordance to the operating instructions.

In one variant, displaying the assist view further comprises: receiving data from a sensor of the robot; identifying an assist event based at least in part on the received data; and generating a graphic indicating the identified assist event.

In another variant, the method further comprises transmitting the assist view to a remote network. In another variant, causing the floor cleaning robot to clean comprises: causing the floor cleaning robot to navigate along a predetermined path; and causing the floor cleaning robot to scrub the floor along the predetermined path.

In another variant, the method further comprises delaying causing the floor cleaning robot to clean in accordance to the operating instructions at least a predetermined time from displaying the assist view.

In another variant, causing the floor cleaning robot to clean in accordance to the operating instructions occurs after receiving a signal indicating that an assist button on the robot has been pushed.

In a fourth aspect, a non-transitory computer-readable storage apparatus is disclosed. In one exemplary implementation, the non-transitory computer-readable storage apparatus has a plurality of instructions stored thereon, the instructions being executable by a processing apparatus to operate the robot. The instructions configured to, when executed by the processing apparatus, cause the processing apparatus to: cause the one or more actuators to perform the robotic task; detect, based at least in part on the sensor data, an obstacle while performing the robotic task; actuate the one or more actuators so that the robot is not performing the robotic task in response to, at least in part, the detected obstacle; display on the user interface an assist view comprising an alert indicative at least in part of the detected obstacle and one or more selectable positions of the robot; receive through the user interface a selected one of the one or more selectable positions of the robot; and actuate the actuators based at least in part on a selected one of the one or more selectable positions of the robot, and continue performing the task.

In a fifth aspect, a system for assisting a robot is disclosed. In one exemplary implementation, the system includes: a robot configured to perform tasks, the robot having one or more sensors to collect data about an environment of the robot, wherein the robot transmits an assist request when it encounters an obstacle in the environment detected in the data of the one or more sensors; an external sensor configured to collect data about at least a portion of the environment of the robot; and a remote network communicatively coupled to the robot and the external sensor, the remote network configured to: receive the assist request from the robot, obtain data from the external sensor in response to the assist request; and determine how to assist the robot.

In one variant, determining how to assist the robot further comprises determining whether the robot can proceed.

In a sixth aspect, a remote network is disclosed. In one exemplary implementation, the remote network includes: a communications unit configured to receive sensor data and a request for assistance from a robot; and a processor configured to: identify an event of interest in the received sensor data; determine whether to acquire more information about the event; based at least in part on the determination of whether to acquire more information, request data from an external sensor about the event; and based at least in part on the data from the external sensor, send an assist request to an access point to assist the robot.

In a seventh aspect, a sensor external to a robot is disclosed. In one exemplary implementation, the sensor is configured to configured to collect data about at least a portion of the environment of the robot; detect an assist event in the data; and communicate with the robot to resolve the assist event.

In one variant, the sensor is further configured to communicate with a remote network to resolve the assist event.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1:
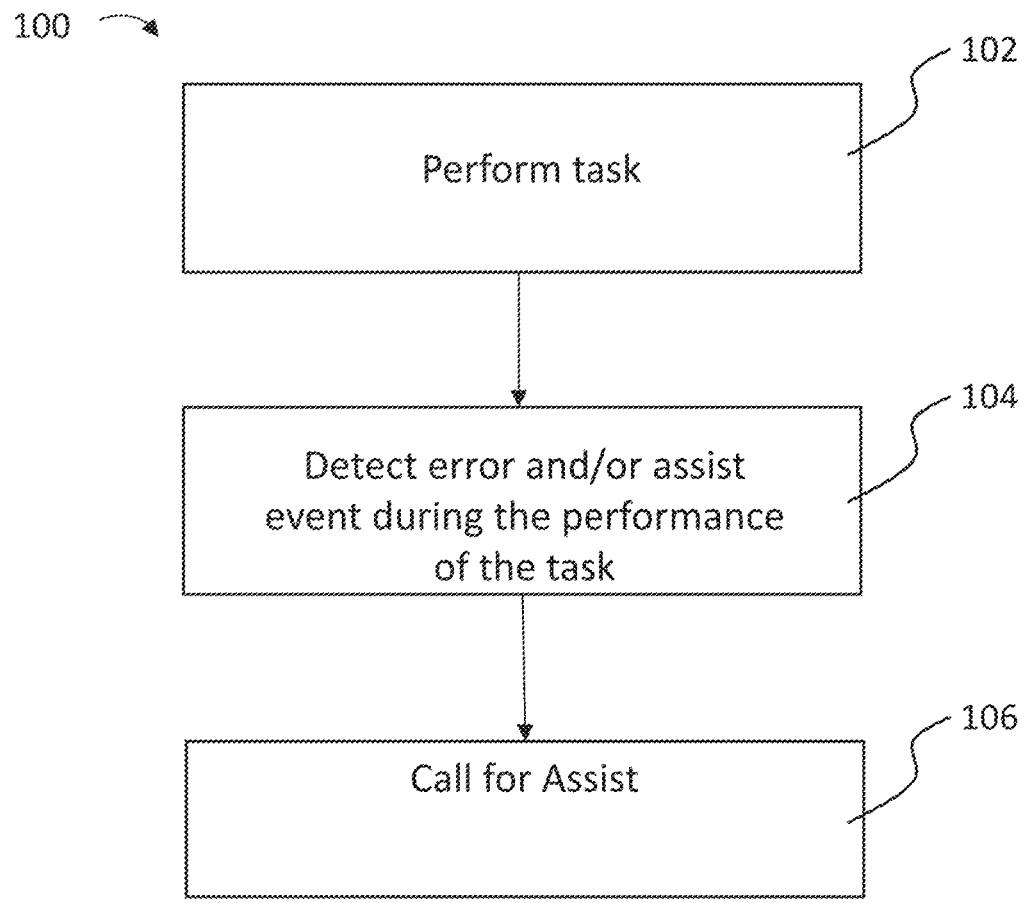
FIG. 1 is a process flow diagram of an exemplary method for operation of a robot in accordance with some implementations of this disclosure.

All Figures disclosed herein are © Copyright 2017 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus can be implemented or a method can be practiced using any number of the aspects set forth herein. In addition, the scope of the disclosure is intended to cover such an apparatus or method that is practiced using other structure, functionality, or structure and functionality in addition to or other than the various aspects of the disclosure as set forth herein. It should be understood that any aspect disclosed herein can be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved remote operating and/or monitoring of a robot. As used herein, a robot can include mechanical and/or virtual entities configured to carry out complex series of actions automatically. In some cases, robots can be machines that are guided and/or instructed by computer programs and/or electronic circuitry. In some cases, robots can include electro-mechanical components that are configured for navigation, where the robot can move from one location to another. Such navigating robots can include autonomous and/or self-driving cars, floor cleaners, rovers, drones, planes, boats, carts, and the like.

In some cases, robots can include appliances, machines, and/or equipment automated to perform one or more tasks. For example, a module can be attached to the appliances, machines, and/or equipment to allow them to operate autonomously. In some implementations, the module can include a motor that drives the autonomous motions of the appliances, machines, and/or equipment. In some cases, the module causes the appliances, machines, and/or equipment to operate based at least in part on spoofing, such as by sending control signals to pre-existing controllers, actuators, units, and/or components of the appliances, machines, and/or equipment. The module can include sensors and/or processors to receive and generate data. The module can also include processors, actuators, and/or any of the components described herein to process the sensor data, send control signals, and/or otherwise control pre-existing controllers, units, and/or components of the appliances, machines, and/or equipment. Such appliances, machines, and/or equipment can include forklifts, tugs, boats, planes, industrial equipment, floor cleaners, stocking machines, home appliances, etc.

As referred to herein, floor cleaners can include floor cleaners that are manually controlled (e.g., driven or remote controlled) and/or autonomous (e.g., using little to no direct user control). For example, floor cleaners can include floor scrubbers that a janitor, custodian, and/or other person operates and/or robotic floor scrubbers that autonomously navigate and/or clean an environment. Similarly, floor cleaners can also include vacuums, steamers, buffers, mops, polishers, sweepers, burnishers, and/or devices intended to clean a floor.

Detailed descriptions of the various implementations and variants of the system and methods of the disclosure are now provided. While many examples discussed herein may refer to robotic floor cleaners, it will be appreciated that the described systems and methods contained herein are applicable to any kind of robot. Myriad other example implementations or uses for the technology described herein would be readily envisaged by those having ordinary skill in the art, given the contents of the present disclosure.

Advantageously, the systems and methods of this disclosure at least: (i) allow robots to safely operate in environments even in unforeseen circumstances; (ii) provide comfort (e.g., by humans and/or animals) with robots by allowing robots to exhibit expected behaviors; (iii) allow for smooth operation of robots without undesired stoppages; and (iv) provide efficient maneuvering of robots. Other advantages are readily discernable by one having ordinary skill in the art given the contents of the present disclosure.

For example, a robot can navigate an environment, collecting data and/or performing actions. By way of illustration, the robot can be a floor cleaner that cleans a floor as it navigates an environment. The robot can collect and/or generate data. For example, the robot can have sensors that sense the environment of the robot, as will be later described in this disclosure with reference to FIG. 3. These sensors can produce data about the environment. The robot can also have sensors that monitor the performance of the robot, such as on/off time, speed, statuses, software version, operation (e.g., performing actions/operations, such as cleaning), maintenance, etc. These sensors can produce data about the robot. The robot can also generate map related data (e.g., data related to and/or that can be used for mapping and/or localization) containing information about the robot's environment and/or route that allow the robot to autonomously navigate an environment.

The robot can encounter events that trigger issues with the robot. In some cases, the issues can be errors, where the robot has a performance-related issue in software and/or hardware. In some cases, the issues can be scenarios where the robot is configured to seek additional input from an operator to be able to determine how the robot should perform. In some cases, these issues can be detected by one or more sensors of the robot. Advantageously, determining that the event has occurred and appropriately requesting an assist can improve operator experience and/or increase confidence in the operation of the robot. Moreover, appropriate systems and methods for assists can allow efficient operation of tasks designated to the robot.

FIG. 1 is a process flow diagram of an exemplary method 100 for operation of a robot in accordance with some implementations of this disclosure. Block 102 includes performing a task. For example, such tasks can be a function associated with the robot, such as navigating, cleaning, moving objects, transporting objects, exploring, mapping, constructing, imaging, diagnosing, and/or any activity desired for a robot. In some cases, the robot can be used by an operator to perform such a task.

Block 104 includes detecting an error and/or assist event during the performance of the task. As used herein assists can relate to situations in which operator assistance of a robot is desirable. For example, operator assistance can relate to operator direction, commands, statuses, etc. In some cases, assists can relate to scenarios caused by errors. For example, errors can include a number of occurrences of a robot that result in impairment of one or more features of the robot.

By way of illustration, fatal errors can include catastrophic failures, loss of connection, emergency shutdowns, destruction, and other occurrences that cause the robot to have little to no functionality. In some cases, there can be relatively little that can be done by the robot once the catastrophic failure has occurred. In some cases, an operator may need to repair and/or replace some portions of the robot before the robot can function again.

As another illustration, errors can include internal errors, which can be errors relating to the internal workings of the software or hardware of the robot. For example, these internal errors can include software component crashes, stack errors and/or overflows, memory gaps and/or memory errors, software component hang-ups and/or freezes, etc. As another example, internal errors can include mechanical-electrical errors and/or failures, such as those related to mechanical and/or electrical systems of the robot, such as actuators, power system, controllers/computers, relays, connectors, cables, etc. Internal errors can also include collisions and/or falsely identified collisions (e.g., where a robot determines, through a mistake in software and/or hardware, that it has collided into something when it has not).

As another illustration, assists can relate to a failure of the robot to proceed with a task, such as a movement, operation, and/or other desired activity. For example, the robot can be inhibited from proceeding with a particular activity. In some implementations, a robot can be configured to perform a task, such as navigating, cleaning, moving objects, transporting objects, exploring, mapping, constructing, imaging, diagnosing, and/or any activity desired for a robot. In some implementations, a robot can be inhibited from completing the task by external occurrences, such as by a blockage (e.g., presence of an obstacle), loss/damage/destruction of a task-related object (e.g., an object the robot is supposed to transport), environmental dangers/hazards for the robot, spills (e.g., caused by the robot or the environment), dangers for the environment and/or objects/people in the environment, and/or external occurrences that can prevent a robot from performing a task. In some implementations, a robot can be inhibited from completing the task by internal occurrences, such as perceptions (e.g., based at least in part on data from sensors of the robot) that it cannot proceed with the task (e.g., based at least in part on the predetermined limits of the robot, such as the an amount of clearance in the robot's predefined footprint parameters of itself as described with reference to FIG. 2A), detection of ghost obstacles (e.g., the robot sees an obstacle that does not exist), noise (e.g., sensor noise, reflections, and/or other unwanted additions/modifications to a signal), delocalization, slippage (e.g., errors in odometry where the robot can mistakenly determine it is somewhere else, including somewhere in which it can hit and/or come close to an object), obstacles detected inside the robot's predefined footprint parameters of itself, etc.

Figure 2A:
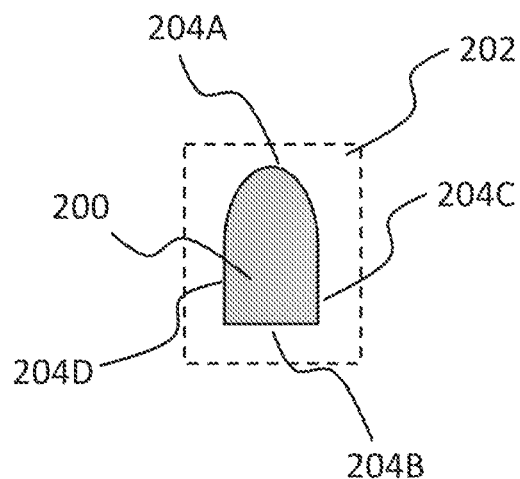
FIG. 2A is a top view diagram illustrating a robot footprint of a robot in accordance with some implementations of this disclosure.

In order to illustrate a robot's predefined footprint of itself, FIG. 2A is a top view diagram illustrating robot footprint 202 of robot 200 in accordance with some implementations of this disclosure. Robot 200 can have a predefined body shape and dimensions. Robot 200 can include a body with a plurality of sides, such as front side 204A, right side 204C, left side 204D, and back side 204B. Robot 200 can also have a top side and a bottom side. A person having ordinary skill in the art, given the contents of the present disclosure, would appreciate that robot 200 can have other sides as well, corresponding to the surfaces of robot 200, which can vary by shape (e.g., rectangular, pyramidal, humanoid, or any other designed shape). By way of illustration, front side 204A can be positioned on the forward-facing side of robot 200, where the forward-facing side is forward in the direction of forward movement of robot 200. Back side 204B can be positioned on the backward-facing side of robot 200, where the backward-facing side is the side facing in substantially the opposite direction of the forward-facing side. Right side 204C can be the right-hand side relative to front side 204A, and left side 204D can be the left-hand side relative to front side 204A.

The actual body of robot 200 is illustrated. However, footprint 202 can be the size of robot 200 configured in the software and/or hardware of robot 200 for determining how it can navigate and/or perform tasks. By way of illustration, footprint 202 can extend (as illustrated) beyond front side 204A, right side 204C, left side 204D, and/or back side 204B, creating a difference between what robot 200 perceives is the size of robot 200 in software and/or hardware (e.g., footprint 202) and what the actual size of robot 200 is in reality. This can allow clearance between robot 200 and/or objects in an environment. Advantageously, footprint 202 can allow a safety buffer for navigation. The size and/or shape of footprint 202 can be based at least in part on a number of factors, including desired clearance, complexity of environments, tolerance to assists, risk of collision (e.g., the occurrence of, the amount of damage of, etc.), and/or other factors. As illustrated, footprint 202 is rectangular; however, footprint 202 can take on any shape desirable, such as square, triangular, rectangular, parallelogram asymmetric shapes, curves, etc. Moreover, footprint 202 is illustrated from a top view, seen as two-dimensional. However, in some cases, footprint 202 can be three dimensional, reflecting robot 200's perception of robot 200 from a plurality of surfaces of robot 200.

As illustrated, in some implementations, footprint 202 can be larger than the actual size of robot 200. A person having ordinary skill in the art, given the contents of the present disclosure, can appreciate that the amount of clearance from each side of footprint 202 relative to robot 200 can vary independently at different points, wherein footprint 202 can be a different shape from robot 200, have asymmetric clearances, and/or variations throughout. In some implementations, footprint 202 can be substantially similar in size and/or shape to robot 200, creating no clearance. Advantageously, having this substantial similarity can allow robot 200 to closely navigate around objects and/or minimize assists. However, having this substantial similarity may provide increased risks of collisions due to noise and/or aberrations in mapping and/or navigation of robot 200.

In some cases, robot 200 can fit through a space, yet footprint 202 can cause robot 200 to perceive that it cannot fit. In such a case, robot 200 stopping because footprint 202 cannot transverse a space can give rise to an assist scenario. An operator could then determine if robot 200 can actually traverse the space and instruct robot 200 accordingly.

As another illustration, assists can relate to a robot getting stuck. For example, a robot can get stuck if it has limitations in performing tasks. By way of illustration, a robot could go into an area from which it cannot navigate out autonomously. Such can be the case where a robot has navigational limitations, including an inability to move in reverse and/or operate in certain direction(s) (e.g., left, right, front, back, etc.). In such cases, an operator may desire to give a robot instructions to combine actions within its limitations to get out and/or physically turn the robot. As another example, a robot can attempt to proceed past an object a plurality of times to no avail. A robot may also get stuck due to internal errors and/or other causes.

In some implementations of this disclosure, assistance can include instructions and/or interactions with the robot. For example, an operator can respond to an error and/or assist event by moving the robot (e.g., taking control of the robot, touching the robot, picking up the robot, rotating the robot, etc.), telling the robot to proceed, resetting the robot, and/or other assistance.

A person with ordinary skill in the art, given the contents of the present disclosure, would appreciate that there are any number of cases in which assisting a robot can be desirable, and the systems and methods of this disclosure are readily adaptable to any of those situations.

Figure 2B:
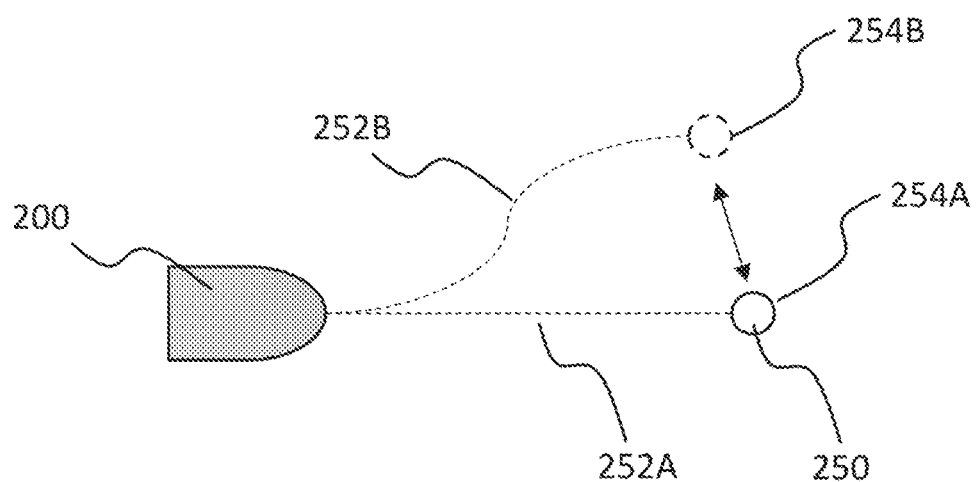
FIG. 2B is a top view diagram of a robot navigating around an object to no avail in accordance with some implementations of this disclosure.

FIG. 2B is a top view diagram of robot 200 navigating around an object 250 to no avail in accordance with some implementations of this disclosure. Robot 200 can initially travel along route 252A. An object 250 can be in position 254A, located along route 252A. Robot can detect the object using one or more sensors (e.g., of sensors unit 312 as described with reference to FIG. 3) As a result, robot 200 can attempt to navigate around position 254A by travelling along route 252B, which can appear to be clear while robot 200 is planning. However, the object 250 can move to position 254B when robot 200 attempts to travel along route 252B. Accordingly, robot 200 can be stymied from proceeding. In some cases, robot 200 can again re-route to route 252A. However, the object 250 can then return to position 254A before robot 200 can reroute. This re-routing can occur a plurality of times to no avail. Accordingly, robot 200 can request an assist after a predetermined number of re-route attempts. The predetermined number of re-route attempts can be determined based at least in part on: the amount of time desired for before robot 200 calls for an assist, the appearance of robot 200 if it is deliberating (e.g., it may be undesirable for robot 200 to appear confused in front of the public, so fewer reroutes may be desired before an assist is called), the desired number of assists (e.g., it may be desirable to have more assists for safety and/or other reasons, or fewer assists to reduce robot dependency on operators), the frequency of rerouting, empirical number of reroutes for resolving an issue, and/or other considerations.

Returning to FIG. 1, block 106 can include calling for an assist. Calling for an assist can include displaying indicative of an assist on the robot, sending a message to an operator (e.g., via wireless or wired signal), communicating to a remote operating center, and/or sending any communication indicative at least in part of an assist. The assist can occur by an operator physically assisting the robot (e.g., moving the robot, moving obstacles, moving objects related to a task of a robot, etc.) and/or issuing directions to the robot (e.g., through a user interface, wireless signal, wired signal, etc.).

Figure 3:
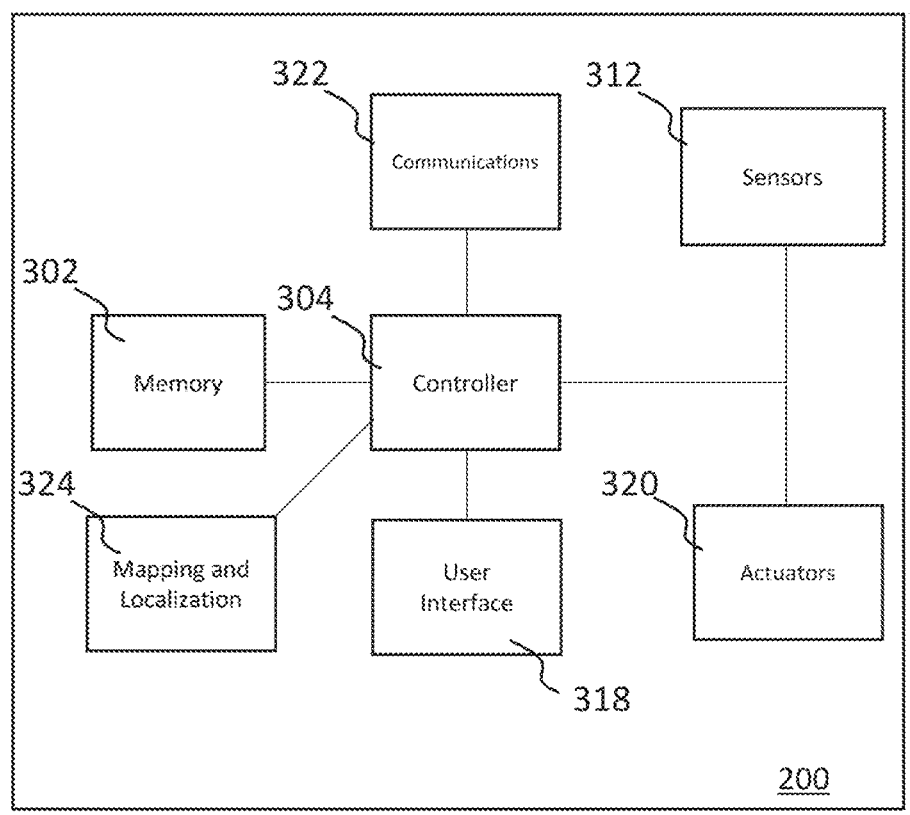
FIG. 3 is a functional block diagram of a robot in accordance with some principles of this disclosure.

FIG. 3 is a functional block diagram of a robot 200 in accordance with some principles of this disclosure. As illustrated in FIG. 3, robot 200 can include controller 304, memory 302, user interface unit 318, mapping and localization unit 324, sensors unit 312, actuators unit 320, and communications unit 322, as well as other components and subcomponents (e.g., some of which may not be illustrated). Although a specific implementation is illustrated in FIG. 3, it is appreciated that the architecture can be varied in certain implementations as would be readily apparent to one of ordinary skill given the contents of the present disclosure. As used herein, robot 200 can be representative at least in part of any robot described in this disclosure.

Controller 304 can control the various operations performed by robot 200. Controller 304 can include one or more processors (e.g., microprocessors) and other peripherals. As used herein, processor, microprocessor, and/or digital processor can include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors can be contained on a single unitary integrated circuit die, or distributed across multiple components.

Controller 304 can be operatively and/or communicatively coupled to memory 302. Memory 302 can include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 302 can provide instructions and data to controller 304. For example, memory 302 can be a non-transitory, computer-readable storage apparatus and/or medium having a plurality of instructions stored thereon, the instructions being executable by a processing apparatus (e.g., controller 304) to operate robot 200. In some cases, the instructions can be configured to, when executed by the processing apparatus, cause the processing apparatus to perform the various methods, features, and/or functionality described in this disclosure. Accordingly, controller 304 can perform logical and arithmetic operations based on program instructions stored within memory 302. In some cases, the instructions and/or data of memory 302 can be stored in a combination of hardware, some located locally within robot 200, and some located remote from robot 200 (e.g., in a cloud, server, network, etc.).

In some implementations, sensors unit 312 can comprise systems and/or methods that can detect characteristics within and/or around robot 200. Sensors unit 312 can comprise a plurality and/or a combination of sensors. Sensors unit 312 can include sensors that are internal to robot 200 or external, and/or have components that are partially internal and/or partially external. In some cases, sensors unit 312 can include one or more exteroceptive sensors, such as sonars, light detection and ranging ("LIDAR") sensors, radars, lasers, cameras (including video cameras (e.g., red-blue-green ("RBG") cameras, infrared cameras, 3D cameras, thermal cameras, etc.), time of flight ("TOF") cameras, antennas, motion detectors, microphones, and/or any other sensor known in the art. In some implementations, sensors unit 312 can collect raw measurements (e.g., currents, voltages, resistances, gate logic, etc.) and/or transformed measurements (e.g., distances, angles, detected points in obstacles, etc.). In some cases, measurements can be aggregated and/or summarized. Sensors unit 312 can generate data based at least in part on measurements. Such data can be stored in data structures, such as matrices, arrays, queues, lists, arrays, stacks, bags, etc. In some implementations, the data structure of the sensor data can be called an image.

In some implementations, sensors unit 312 can include sensors that can measure internal characteristics of robot 200. For example, sensors unit 312 can measure temperature, power levels, statuses, and/or any other characteristic of robot 200. In some cases, sensors unit 312 can be configured to determine location using the odometry of robot 200. For example, sensors unit 312 can include proprioceptive sensors, which can comprise sensors such as accelerometers, inertial measurement units ("IMU"), odometers, gyroscopes, speedometers, cameras (e.g. using visual odometry), clock/timer, and the like. Odometry can facilitate autonomous navigation and/or other autonomous actions of robot 200. This odometry can include measurements of robot 200's position (e.g., where position can include robot's location, displacement and/or orientation, and can sometimes be interchangeable with the term pose as used herein) relative to the initial location. Such data can be stored in data structures, such as matrices, arrays, queues, lists, arrays, stacks, bags, etc. In some implementations, the data structure of the sensor data can be called an image.

Mapping and localization unit 324 can receive sensor data from sensors unit 312 to localize robot 200 in a map. In some implementations, mapping and localization unit 324 can include localization systems and methods that allow robot 200 to localize itself in the coordinates of a map and/or relative to a location (e.g., an initialization location, end location, beacon, reference point, etc.). Mapping and localization unit 324 can also process measurements taken by robot 200, such as by generating a graph (e.g., position graph) and/or map. In some implementations, mapping and localization unit 324 can be at least a portion of controller 304.

In some implementations, user interface unit 318 can be configured to enable a user to interact with robot 200. For example, user interface unit 318 can include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. User interface unit 318 can include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. In some implementations user interface unit 318 can be positioned on the body of robot 200. In some implementations, user interface unit 318 can be positioned away from the body of robot 200, but can be communicatively coupled to robot 200 (e.g., via communication units including transmitters, receivers, and/or transceivers) directly or indirectly (e.g., through a network, server, and/or a cloud).

In some implementations, communications unit 322 can include one or more receivers, transmitters, and/or transceivers. Communications unit 322 can be configured to send/receive a transmission protocol, such as, without limitation, one or more of BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, network interfaces can include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi can include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

Communications unit 322 can also be configured to send/receive utilizing a transmission protocol over wired connections, such as any cable that has a signal line and ground. For example, such cables can include Ethernet cables, coaxial cables, Universal Serial Bus ("USB"), FireWire, and/or any connection known in the art. Such protocols can be used by communications unit 322 to communicate to external systems, such as computers, smart phones, tablets, data capture systems, mobile telecommunications networks, clouds, servers, or the like. Communications unit 322 can be configured to send and receive signals comprising of numbers, letters, alphanumeric characters, and/or symbols. In some cases, signals can be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 322 can be configured to send and receive statuses, commands, and other data/information. For example, communications unit 322 can communicate with a user operator to allow the user to control robot 200. Communications unit 322 can communicate with a server/network (e.g., a remote network) in order to allow robot 200 to send data, statuses, commands, and other communications to the server. The server can also be communicatively coupled to computer(s) and/or device(s) that can be used to monitor and/or control robot 200 remotely. Communications unit 322 can also receive updates (e.g., firmware or data updates), data, statuses, commands, and other communications from a server for robot 200.

Actuators unit 320 can include any system used for actuating, in some cases to perform tasks. For example, actuators unit 320 can include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. In some implementations, actuators unit 320 can include systems that allow movement of robot 200, such as motorize propulsion. For example, motorized propulsion can move robot 200 in a forward or backward direction, and/or be used at least in part in turning robot 200 (e.g., left, right, and/or any other direction). By way of illustration, actuators unit 320 can control if robot 200 is moving or is stopped and/or allow robot 200 to navigate from one location to another location. Actuators unit 320 can also be configured to actuate other instruments of robot 200, such as turning on/off water, turning on/off brushes, spraying water, turning on/off vacuums, moving vacuum hose positions, moving appendages (e.g., robotic arms, legs, hands, feet, etc.), and/or any other action.

One or more of the units described with respect to FIG. 3 (including memory 302, controller 304, sensors unit 312, user interface unit 318, actuators unit 320, communications unit 322, mapping and localization unit 324, and/or other units) can be integrated onto robot 200, such as in an integrated system. However, in some implementations, one or more of these units can be part of an attachable module. This module can be attached to an existing apparatus to automate so that it behaves as a robot. Accordingly, the features described in this disclosure with reference to robot 200 can be instantiated in a module that can be attached to an existing apparatus and/or integrated onto robot 200 in an integrated system. Moreover, in some cases, a person having ordinary skill in the art, given the contents of the present disclosure, would appreciate that at least a portion of the features described in this disclosure can also be run remotely, such as in a cloud, network, and/or server. In some cases, controller 304 can perform include one or more of the units illustrated in FIG. 3, and/or other actions performed by robot 200 can be processed by controller 304.

Figure 4:
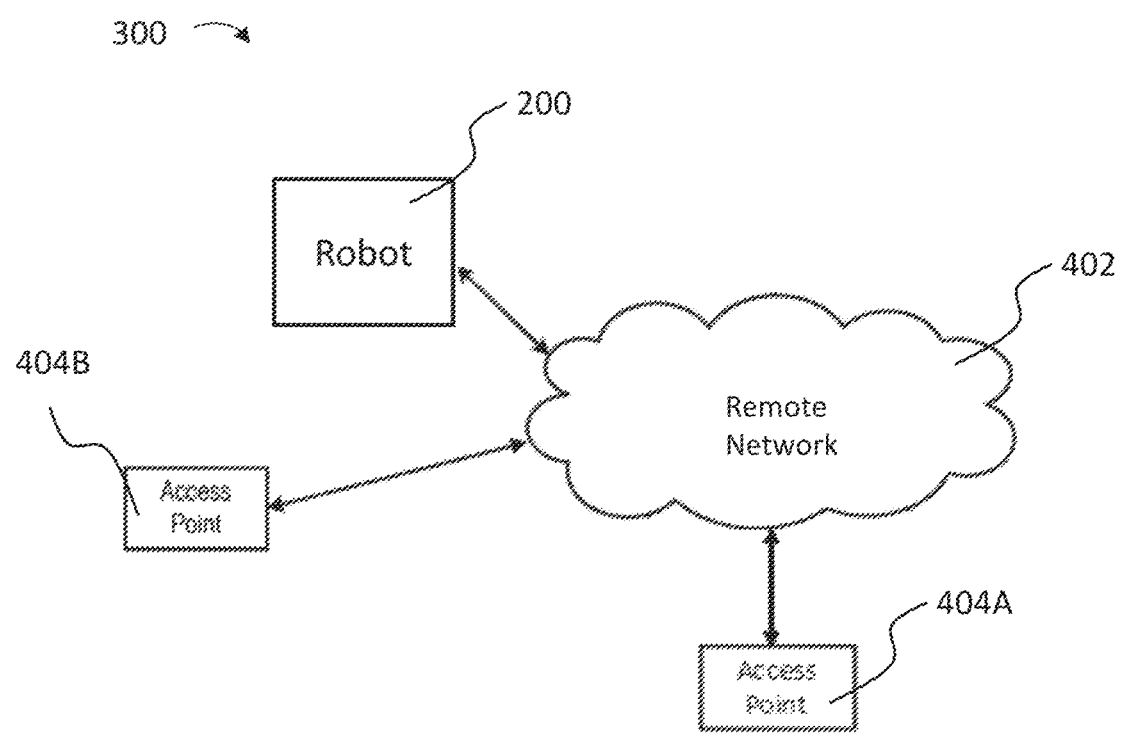
FIG. 4 is a functional block diagram of a system, which includes a robot communicatively and/or operatively coupled to a remote network in accordance with some implementations of this disclosure.

In some implementations, robot 200 can be communicatively coupled to a remote network. FIG. 4 is a functional block diagram of system 400, which includes robot 200 communicatively and/or operatively coupled to remote network 402 in accordance with some implementations of this disclosure. Remote network 402 can comprise a collection of hardware, software, services, and/or resources that can be invoked to instantiate a virtual machine, process, or other resource for a limited or defined duration, or an unlimited or undefined duration. Remote network 402 can be communicatively and/or operatively coupled to a plurality of devices, systems, and/or servers, including devices and/or servers that have access to the internet. One or more of access points, such as access points 404A and 404B, can be devices, systems, and/or servers, including, but not limited to, computers, mobile devices, tablets, smart phones, cells phones, personal digital assistants, phablets, e-readers, smart watches, set-top boxes, internet streaming devices, gaming consoles, smart appliances, and/or any device with access to the internet and/or any network protocol. Although two access points are illustrated, there can be more or fewer access points as desired.

As used herein, remote network 402 can be operated: remote network 402 can have onboard computers that can receive, process, and/or send information. These computers can operate autonomously and/or under control by one or more human operators. Similarly, remote network 402 can have access points (e.g., access points 404A and 404B), which can similarly be used to operate remote network 402. The access points can have computers and/or human operators that can receive, process, and/or send information. Accordingly, references herein to operation of remote network 402 can be applied to a human operator and/or a computer operator.

In some implementations, one or more robots that are substantially similar to robot 200 can be communicatively and/or operatively coupled to remote network 402. Each of these robots can communicates statuses, commands, and/or operative data to remote network 402. Remote network 402 can also store and/or communicate statuses, commands, and/or operative data to these one or more of robots.

A person having ordinary skill in the art, given the contents of the present disclosure, would appreciate that some portions of this disclosure may be performed by robot 200, network 402, and/or access points 404A and/or 404B. Though certain examples may be described with reference to one or more of robot 200, network 402, and/or access points 404A and/or 404B, it would be appreciated that the features of the examples can be distributed amongst robot 200, network 402, and/or access points 404A and/or 404B to achieve substantially similar results.

Figure 5:
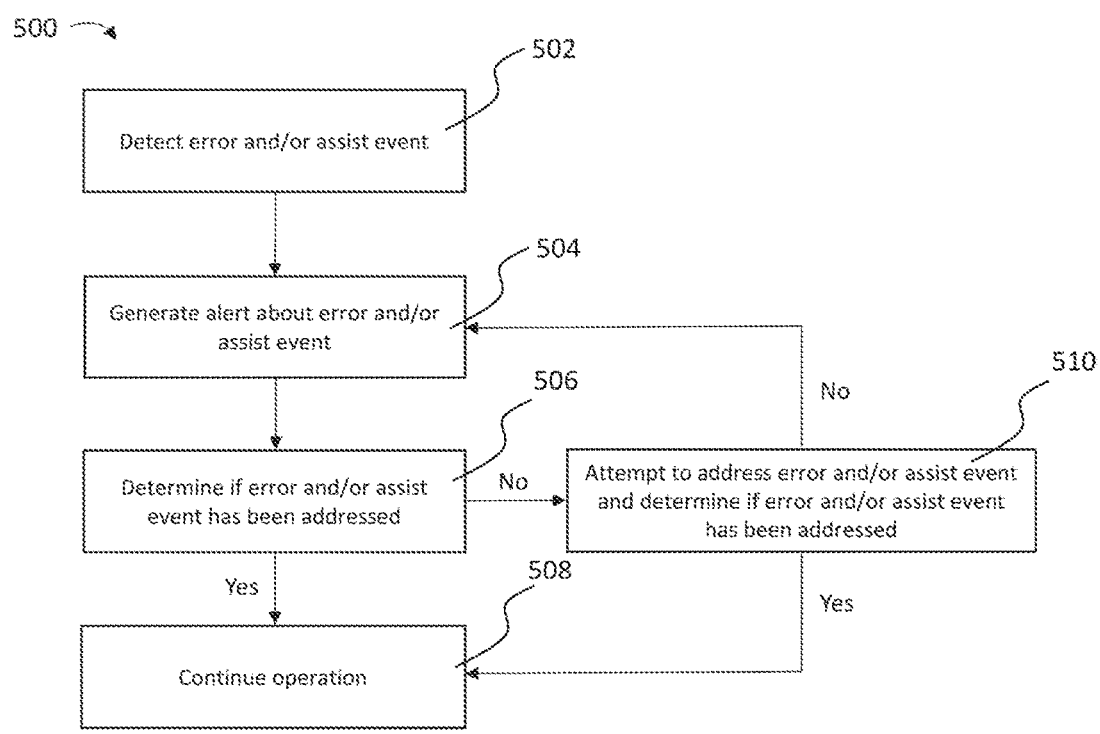
FIG. 5 is a process flow diagram of an exemplary method for issuing an assist request in accordance with some implementations of this disclosure.

FIG. 5 is a process flow diagram of an exemplary method 500 for issuing an assist request in accordance with some implementations of this disclosure. Block 502 includes detecting an error and/or assist event. The error and/or assist event can be detected using one or more sensors of sensors unit 312. For example, exteroceptive sensors of sensor units 312 can detect errors and/or assist events relating to the environment of robot 200. By way of illustration, an error and/or assist event can relate to a failure of robot 200 to proceed with a task. In some cases, robot 200 can use a sensor of sensors unit 312 (e.g., LIDAR, sonar, camera, etc.) to detect an object (e.g., an item, obstacle, person, flat object, big object, glass, etc.).

For example, some sensors of sensors unit 312 emit and receive energy in order to detect characteristics of an environment of robot 200. Such energy can include one or more of sound, light, electromagnetic waves, etc. By way of illustration, the sensor can be a LIDAR, which can detect characteristics of an environment by emitting light and measuring light at a receiver (e.g., including reflected light). The presence of an obstacle can be detected by using the LIDAR. In some implementations, mapping and localization unit 324 can determine that the obstacle falls along the global or local path of robot 200. Accordingly, robot 200 can determine that the path is impeded. Other examples include sound waves used by a sonar. Various cameras also may emit and receive light, and/or use filters to examine certain frequencies of light.

In some cases, an object and/or obstacle can be identified by robot 200, such as by detecting characteristics of the object and/or matching the data from the sensor of sensors unit 312 to identified objects in a library of sensor data. In some cases, robot 200 may not specifically identify an object, but rather just detect the presence of an object. As another example, proprioceptive sensors of sensor units 312 can detect errors and/or assist events relating to robot 200. The proprioceptive sensors can detect characteristics of robot 200 in which robot 200 may desire assistance. In some implementations, once robot 200 has detected an error and/or assist event, robot 200 can identify the error and/or assist event. Other errors and assist events can be substantially similar to those described with reference to block 104 in method 100 of FIG. 1.

In some cases, memory 302 can store a library of sensor data. In some cases, the sensor data can be associated at least in part with assist events and/or errors. In some implementations, this library can include sensor data related to assist events and/or errors in different conditions, such as sensor data related to objects with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library can be taken by a sensor (e.g., a sensor of sensors unit 312 or any other sensor) and/or generated automatically, such as with a computer program that is configured to generate/simulate (e.g., in a virtual world) library sensor data (e.g., which can generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library can depend at least in part on one or more of the amount of available data, the variability of the surrounding environment in which robot 200 operates, the complexity of objects, the variability in appearance of objects, physical properties of robots, the characteristics of the sensors, and/or the amount of available storage space (e.g., in the library, memory 302, and/or local or remote storage). In some implementations, at least a portion of the library may be stored on a network (e.g., cloud, server, distributed network, etc.) and/or may not be stored completely within memory 302. As yet another example, various robots (e.g., that are commonly associated, such as robots by a common manufacturer, user, network, etc.) can be networked so that data captured by individual robots are collectively shared with other robots. In such a fashion, these robots can be configured to learn and/or share sensor data in order to facilitate the ability to readily detect and/or identify errors and/or assist events.

In some implementations, due to predetermined patterns in the sensor data and/or patterns learned by robot 200, robot 200 can identify an error and/or assist event that has occurred. For example, errors and/or assist events can include categories of errors, such as fatal error, internal error, failure of the robot to proceed with a task, a robot getting stuck, etc. Other identifications of categories of errors can also be predetermined, including specific ones such as out of battery, obstacle in way, out of cleaning fluid, stack error, overheating, person detected, and/or any predetermined identification of an error. In some cases, robot 200 can be configured to identify and/or recognize people, animals, objects, and/or other bodies detected in its sensors. A person having ordinary skill in the art, given the contents of the present disclosure, would appreciate that errors and/or assist events can be given predetermined identifications as desired. For example, the type of assistance desired can be different based on whether robot 200 detects people, animals, objects, and/or other bodies. Robot 200 can follow logical operations based on what robot 200 detects/identifies. A person and/or animal can move away from a trajectory of robot 200 in performing a task. Accordingly, in some cases, where robot 200 detects a person and/or animal, robot 200 can wait for the person and/or animal to move away. In some cases, robot 200 may not issue an assist event and/or error at all and/or issue an assist event and/or error after a longer wait (e.g., predetermined time) in order to give time for the person and/or animal to move away. As another example, if robot 200 identifies a box and/or static object in its path, robot 200 may issue an assist event and/or error sooner (e.g., predetermined time) because the box and/or static will probably not move away.

By way of illustration, robot 200 can detect fatal errors and/or internal errors using certain sensors of sensors unit 312. For example, electrical switches, light sensors, and/or other sensors known in the art can be used to measure when fluids fall below desired levels in robot 200. Robot 200 can monitor various components of robot 200, including implementing test procedures. Accordingly, robot 200 can detect when errors occur.

As another illustration, robot 200 can detect other errors, such as failure of robot 200 to proceed with a task. In some cases, robot 200 can detect obstacles with exteroceptive sensors, such as LIDAR, sonar, cameras (e.g., TOF cameras, RBG cameras, etc.), and/or any other sensors configured to detect objects. In some cases, objects can be detected through local planning, such as where robot 200 can detect objects by one or more points appearing locally in the data of the exteroceptive sensors. This local planning can be used by robot to navigate spaces within range of the exteroceptive sensors, such as by detecting the presence of objects within the trajectory of robot 200. In this way, robot 200 can avoid crashing into objects. In some cases, robot 200 can detect objects through its global planning, wherein robot 200 can detect objects from global maps. As another illustration, robot 200 can detect being stuck from the status of robot 200 (e.g., status generated based at least in part from data from proprioceptive sensors).

In some implementations, detection of an error and/or assist event can be based at least in part on a window of time. By way of illustration, an object can move in front of robot 200 and then later move away. In some cases, if an error and/or assist event is based on a single measurement, robot 200 can detect the object when a pixel in the sensor data indicates the presence of an object. However, this might not be desirable. It can be desirable for robot 200 to have some robustness to not stop and generate an alert about an error and/or assist event whenever it encounters an object. Moreover, relying on a single measurement of a sensor to detect an error and/or assist event can be overly influenced by noise. For example, due to ephemeral and/or transient variations in measurements, false positives can occur (e.g., objects detected, fluids perceived as low, etc.). Accordingly, detection of an error and/or assist event can in some cases rely at least in part on a sustained and/or pattern of measurements from sensors in a window of time.

The length of the window of time can be predetermined as desired. In some cases, the length can be based at least in part on tolerance to false positives, dangers of failures to detect, empirical data, environmental features, and/or other considerations. In some cases, the length of time can be approximately 15 seconds in order to give enough time for errors and/or assist events to be resolved without operator assistance.

In some implementations, robot 200 can be stopped before robot 200 detects an error and/or assist event. By way of illustration, in some cases, if robot 200 detects an obstacle (e.g., while it is actuating, such as by moving an arm or navigating), robot 200 can stop. Robot 200 can then implement other courses of action to see if an error and/or assist event has occurred. For example, robot 200 can determine if there is a route around the obstacle. If there is not another course of action that robot 200 determines robot 200 can take, robot 200 can then stay in a stopped position. In some cases, the obstacle can move away and the robot can proceed. In other cases, the obstacle can persist, and robot 200 can detect an error and/or assist event.

In some cases, robot 200 being stopped includes stopping performance of a task. For example, robot 200 can have actuators that perform a task, such as actuators configured to move brushes, vacuums, limbs, fluid output, wheels, etc. These actuations can be harmful to the environment of robot 200 and/or wear robot 200 in certain scenarios. By way of illustration, where robot 200 is a floor cleaner, robot 200 can have a brush that brushes a floor. If robot 200 is not moving, the brush may run on substantially the same place for a period of time; this running can lead to the brush causing damage to the floor. Accordingly, stopping can include activating an actuator to lift the brush deck and/or stopping the brush from revolving. As a further illustration in this same example, the floor cleaner may also put water on the floor to be able to clean. If robot 200 is not moving, a vacuum in the back may not pick up all the water, causing spillage. In some implementations of this disclosure, robot 200 can shut off a valve and/or otherwise prevent robot 200 from putting water on the floor. As a further illustration in this same example, a vacuum of the floor cleaner may wear if it is left in the same place for an extended period. In some implementations of this disclosure, robot 200 can shut off the vacuum. As another example, robot 200 may have a motor running for motion. Leaving the motor on while robot 200 is not performing a task can lead to motor wear, pollution, and/or other harms.

In some implementations, a detected error and/or assist event in one case may not be a detected error and/or assist event in others. For example, robot 200 can learn and/or observe how an operator handles an error and/or assist event in one iteration, and perform substantially similar actions if the same error and/or assist event occurs later. By way of illustration, in a first iteration (e.g., of a plurality of iterations), robot 200 can perform method 500. Robot 200 can associate the actions taken by an operator with the circumstances that gave rise to the detected error and/or assist event in block 502. In a subsequent iteration, when robot 200 detects substantially similar circumstances, robot 200 can determine that it should take the actions associated with such circumstances, thereby avoiding performing at least a portion of the blocks of method 500. In some cases, robot 200 can learn to associate the actions taken by the operator over a plurality of iterations, such as through an iterative machine learning process.

Block 504 includes generating an alert about the error and/or assist event. The alert can appear on a user interface unit 318, remote network 402, and/or access points 404A and/or 404B. The alert can include a general statement that there has been an error and/or assist event, and/or the alert can include the identification of the error and/or assist event.

In some implementations, there can be logical operations performed to determine where the assist appears. In some implementations, such logical operations can be performed by robot 200, such as by using controller 304. The logical operations can determine where the assist appears based at least in part on the circumstances, such as the sensor data of robot 200, environmental conditions, identified objects in the environment, identified error and/or assist event, and/or any other indicator of the circumstances of the error and/or assist event. By way of illustration, where the assist event is a pathway being too narrow (and it is unclear if robot 200 can pass) robot 200 can issue an assist to remote network 402. Remote network 402 (and/or an operator of remote network 402) can then determine if robot 200 can pass through and/or tell robot 200 to proceed. If robot 200 cannot pass through, at least in part based on a determination of remote network 402, remote network 402 can issue an assist request to a operator (e.g., who can see the assist request on user interface unit 318 and/or access points 404A and/or 404B). In this way, the operator can go assist robot 200 (e.g., by moving objects and/or robot 200). As another example, a blocked path may not need a determination by remote network 402 (and/or an operator of remote network 402), and swifter assistance could occur by going more quickly to a physical operator who could move robot 200 and/or the objects. According, robot 200 can pass the assist to user interface 318 and/or access points 404A and/or 404B (e.g., directly between robot 200 and/or access points 404A and/or 404B, and/or through network 402) instead of waiting for remote network 402 to assist.

In some implementations, the logical operations can determine where to send an assist contemporaneously. For example, robot 200 can issue an assist to a plurality of remote network 402, user interface unit 318, access points 404A and/or 404B, and/or other devices, where the assist is issued at substantially the same time. Similarly, in such cases, the assists may not have a hierarchy, wherein assistance from any device is treated similarly.

In some implementations, assists to remote network 402, user interface unit 318, access points 404A and/or 404B, and/or other devices can have a hierarchy, such as a hierarchy characterized at least in part on the authority of the response and/or on the order in which assistance is requested.

For example, a hierarchy based on authority can be implemented. In such a case, robot 200 can place heavier weight to input by one device over other devices. For example, user interface unit 318 is located on robot 200. Accordingly, assistance entered through user interface unit 318 can be perceived as more apropos to the circumstances at hand. Accordingly, in some implementations, instructions from user interface unit 318 can override instructions received from others.

As another example, in some cases, remote network 402 can be characterized at least in part as a centralized control center. Accordingly, instructions by remote network 402 (and/or operators of remote network 402) can reflect at least in part experiences across a plurality of robots. In some cases, such instructions can override instructions received from others. In some cases, one or more of access points 404A and/or 404B, and/or other devices can be designated the highest (e.g., most authoritative) in the hierarchy. For example, access point 404A can be operated by a developer, manufacturer, etc. who can have specialized knowledge of robot 200. Advantageously, having a hierarchy based on authority can allow robot 200 to sort through different instructions and/or perform more optimal actions.

As another example, in some implementations, the hierarchy can be characterized by the order in which assistance is requested. For example, in some cases, an assist can be issued to remote network 402 first relative to other devices. Advantageously, this can allow an enhanced user experience by resolving at least some issues without disturbing an operator. If remote network 402 does not respond, and/or is unable to give appropriate instructions and/or assistance (e.g., a physical interaction is desired), the assist can go to user interface unit 318, access points 404A and/or 404B, and/or other devices. As another example, assists can be issued to user interface unit 318 first in order to allow a person with more circumstantial knowledge (e.g., a person who is on-site) to deal with the issue first. In some cases, safety and/or other considerations can make immediate on-site assistance desirable. Advantageously, having a hierarchy characterized by the order in which assistance is requested can allow for the efficient resolution of assists without overburdening resources. In some cases, there can be a predetermined delay between when each assist is issued. Such predetermined delay can be determined based at least in part on the amount of time to handle an assist, the response time of the device (e.g., a person and/or computer operating user interface unit 318, remote network 402, access points 404A and/or 404B, and/or other devices), empirical evidence of response times, workflow optimization, and/or other considerations.

In some implementations, the alert about the error and/or assist event can be in text form. By way of illustration, the alert can be a text message sent to an operator of robot 200 to inform the operator of the error and/or assist event. The alert can be sent via SMS, the internet, radio, light, electric field, and/or any other form of communication (e.g., using communications unit 322). Advantageously, because some operators of robot 200 may perform other tasks and/or manage other robots, sending the alert to the operator can allow the operator to be away from robot 200 and/or performing other tasks.

Figure 6A:
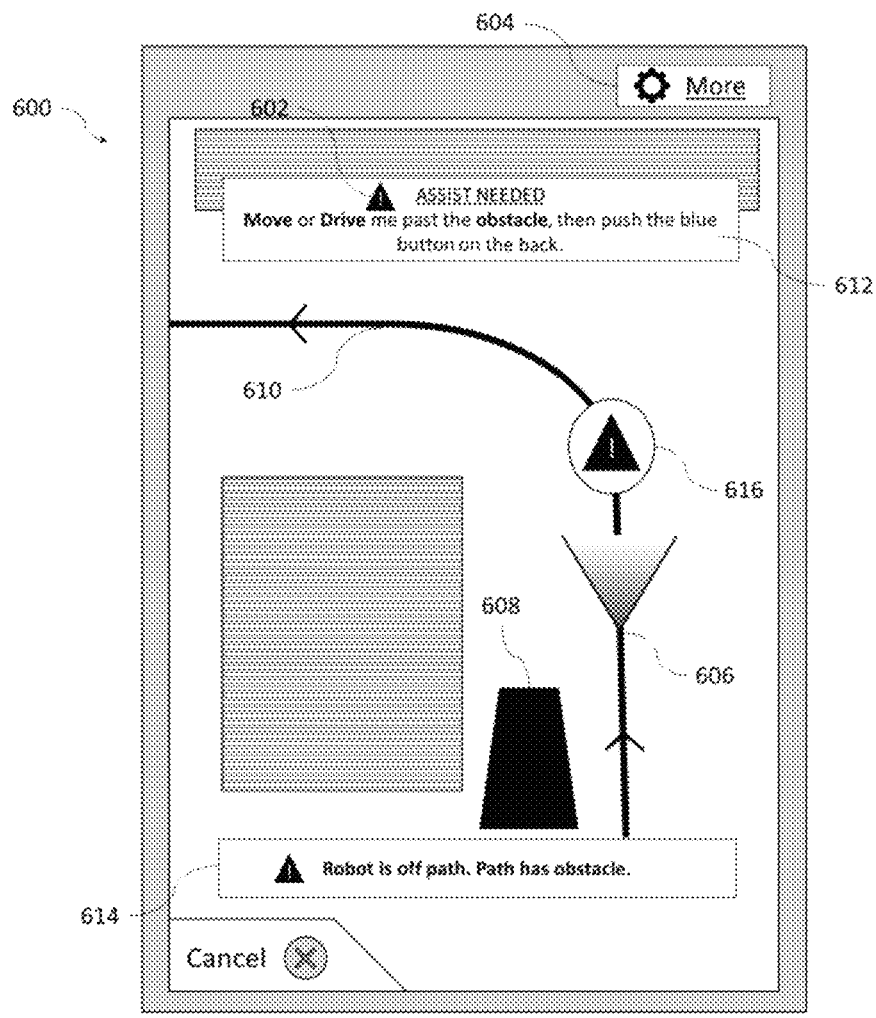
FIG. 6A-6C are displays that show assist views in accordance with some implementations of the present disclosure.

By way of illustration, FIG. 6A is a display 600 that shows that an assist is needed in accordance with some implementations of the present disclosure. Display 600 can be displayed on user interface unit 318, remote network 402, and/or access points 404A and/or 404B. In some implementations, display 600 can be on a stand-alone device (e.g., of access points 404A and/or 404B) communicatively coupled to robot 200. In some cases, the stand-alone device can be called an assistance device as it is used to assist robot 200.

Display 600 can have panel 602, which displays that an assist is needed. Panel 602 can also be used to display other text, such as "error detected," "assist requested," and/or other text indicative at least in part of an error and/or assist event.

Panel 614 can display further clarification of why there is an error and/or assist event. For example, as illustrated in FIG. 6A, panel 614 indicates that robot 200 is off path and that the path has an obstacle. A person having ordinary skill in the art, given the contents of the present disclosure, would appreciate that panel 614 can display any text indicative at least in part of the error and/or assist event that has occurred. For example, panel 614 can display information indicative at least in part of fatal errors, internal errors, failure of the robot to proceed with tasks, a robot getting stuck, and/or any other event that can give rise to an error and/or assist event.

Panel 612 can display a direction for an operator and/or any other user. In some cases, the direction can be contextual based at least in part on the error and/or assist event. For example, where robot 200 (e.g., which can be displayed in display 600 as robot icon 608) needs an assist to drive past an obstacle, panel 612 can display an instruction for an operator and/or other user to deal with the obstacle. For example, as illustrated in FIG. 6A, panel 612 can state "remove or drive me past the obstacle, then push the BLUE button in the back." In this example, the blue button in the back of robot 200 can be an external button that a user pushes to give robot 200 feedback, such as to indicate to robot 200 that the operator and/or other user has taken care of the error and/or assist event. In some cases, the button can be a physical button that a user presses. The button can be any color as desired. The button can be a digital button and/or other input mechanism to robot 200, such as input through user interface unit 318. In some implementations the button can be called an assist button as it is at least a portion of assisting robot 200. In some implementations, even if robot 200 receives instructions through other avenues (e.g., display 600), robot 200 will not proceed until the button has been pushed (and/or robot 200, remote network 402, access point 404A and/or 404B receive a signal indicative at least in part that the button has been pushed). In some implementations, the button can cause robot 200 to re-localize and detect where it is to continue operation. For example, if robot 200 has been moved, robot 200 can determine where it is and what path it should take using mapping and localization unit 324. In some implementations, there may be no button, and robot 200 can determine that the operator and/or other user has taken care of the error and/or assist event from data from sensors unit 312. Similarly, once robot 200 has determined that the error and/or assist event has been resolved, robot 200 can determine where it is and what path it should take using mapping and localization unit 324. A person having ordinary skill the art, given the contents of the present disclosure, would appreciate that the instructions in panel 612 can include any instruction given to address the error and/or assist event. As additional examples, panel 612 can instruct an operator and/or user to fill fluids, adjust portions of robot 200 (e.g., propellers, brushes, wheels, etc.), move robot 200, move aspects of the environment of robot 200, turn/of robot 200, and/or any other instruction.

Panel 604 can include further information for an operator and/or other user regarding the error and/or assist event. For example, panel 604 can include a visual depiction of the error and/or assist event. As illustrated in FIG. 6A, robot 200 is off path and/or is impeded by an obstacle. Robot icon 608 is, accordingly, displayed off path 610. In some implementations, robot icon 608 can be positioned relative to other graphics in panel 604 to indicate at least in part the position and/or pose of robot 200. In some cases, robot icon 608 can be off path 610 to reflect that robot 200 is off the path illustrated by path 610. In some cases, robot icon 608 can be on path 610 to reflect that robot 200 is on the path illustrated by path 610.

In some implementations, panel 604 can include sensor data, such as data from one or more sensors of sensors unit 312 and/or external sensors. Advantageously, sensor data can give an operator context. In some implementations, the sensor data includes images and/or video showing at least a portion of what robot 200 saw when it detected an error and/or assist event.

Icon 616 can display the location of the obstacle. For example, icon 616 can be positioned in panel 604 relative to robot icon 608 to be indicative at least in part of the relative location, orientation, position, and/or pose of an obstacle relative to robot 200. In some implementations, there can be an indicator depicting where robot 200 detected the obstacle. For example, indicator 606 is positioned relative to icon 616 to indicate at least in part where robot 200 detected an obstacle. In some cases, indicator 606 can include a field of view showing the field of view of robot 200 when it detected an obstacle, such as the obstacle indicated by icon 608.

Figure 6B:
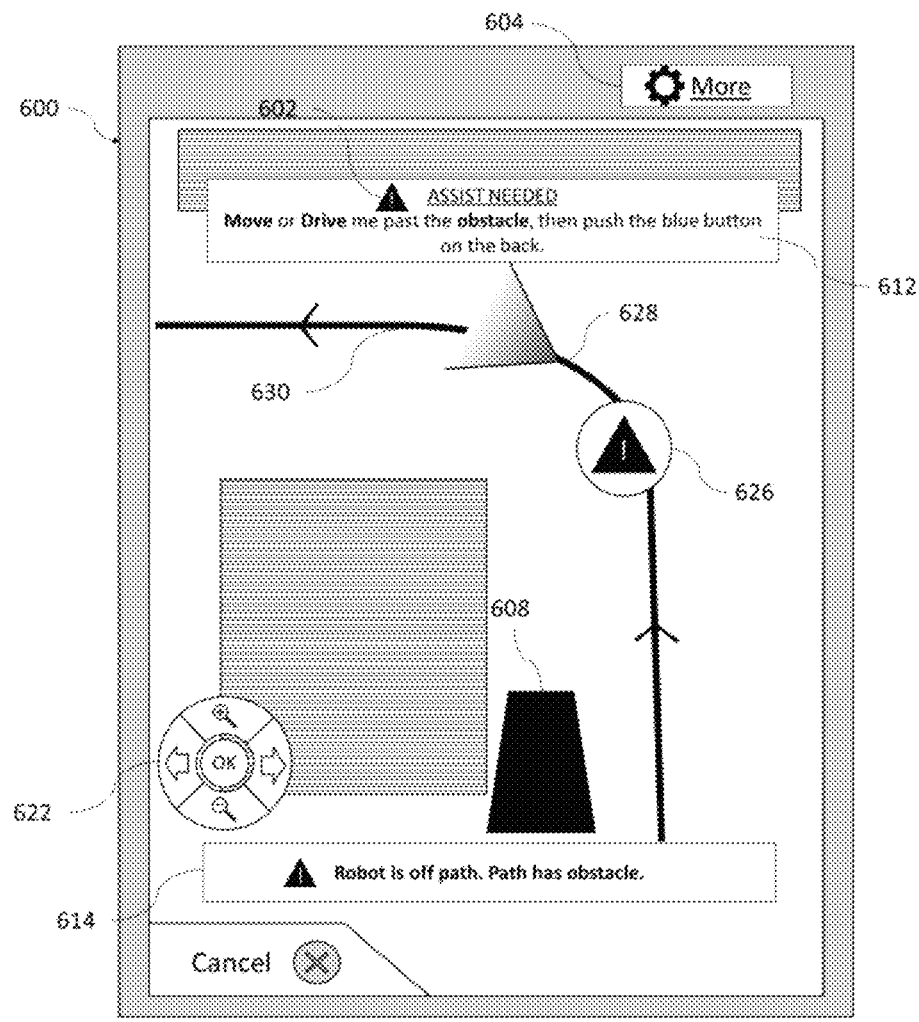

In some implementations, display 600 can also illustrate the process for assistance. By way of illustration, FIG. 6B is a display view indicating that robot 200 is off path and there is an obstacle in the path of robot 200 in accordance with some implementations of the present disclosure. In display 600, path 630 indicates the path which robot 200 (shown as robot icon 608) is configured to travel. Icon 626 illustrates the relative location on the path of robot 200. Icon 628 illustrates the location to which robot 200 should proceed in order to clear the obstacle. In some cases, an operator can move robot 200 to the location indicated by indicator 626, such as by driving, carrying, manipulating, and/or otherwise causing to translate. Icon 622 is a zoom icon that can allow a viewer of display 600 to zoom in and/or out in display 600, enabling the viewer the potential to better evaluate the situation.

Figure 6C:
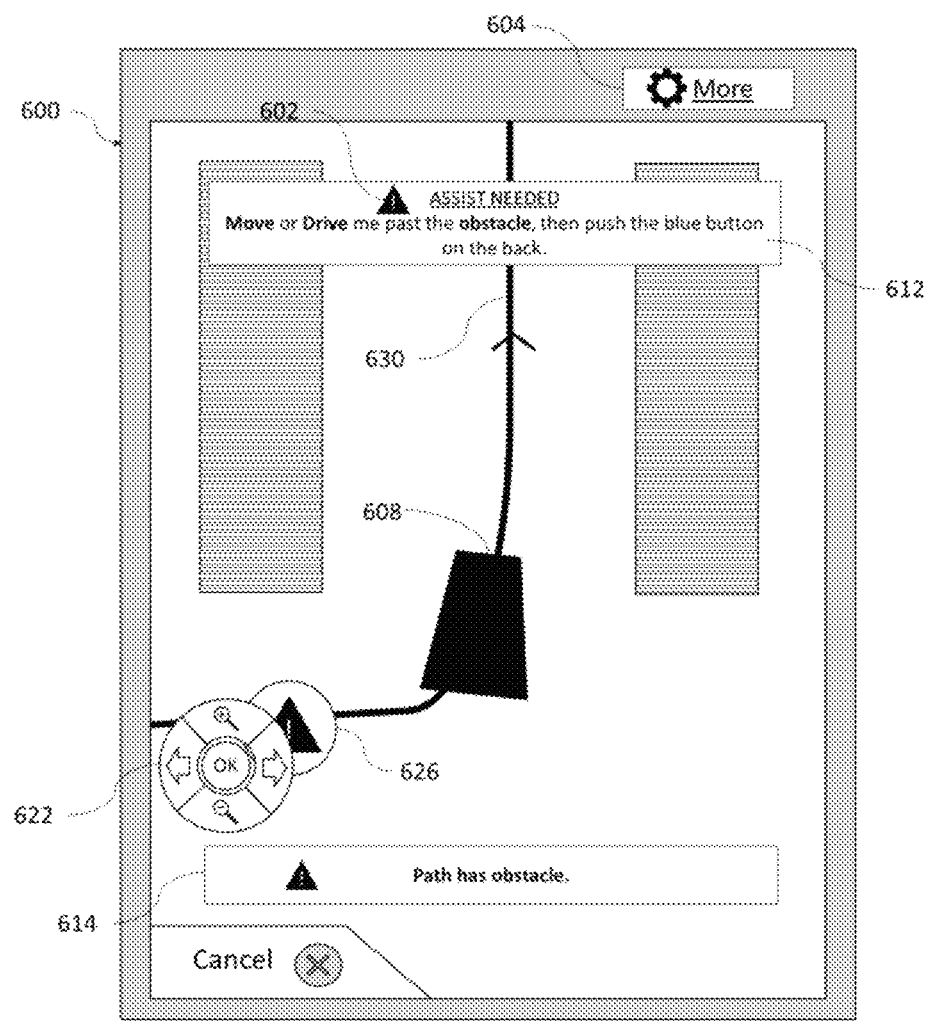

FIG. 6C is a display view showing the continuation of robot 200 after assistance in accordance to some implementations of the present disclosure. In FIG. 6C robot 200 has proceeded to the location of icon 628 illustrated in FIG. 6B. Accordingly, robot 200 can proceed along the path illustrated by path 630.

Returning to FIG. 5, Block 506 includes determining if an error and/or assist event has been addressed. Robot 200 can determine if assistance has been received in one or more ways. In some implementations, robot 200 can use one or more sensors of sensors unit 312 to determine if the error and/or assist event has been resolved. For example, robot 200 can use one or more of sensors unit 312 to determine if obstacles are no longer in the way, fluids are filled, hardware and/or software has been repaired, and/or any fatal errors, internal errors, failure of the robot to proceed with tasks, a robot getting stuck, and/or any other event that can give rise to an error and/or assist event have been addressed.

In some cases, robot 200 can have a button, such as the button discussed with reference to FIG. 6A. An operator and/or other user can push the button if assistance is given.

In some cases, external sources can be used to determine if an error and/or assist event has been resolved. For example, a remote network 402 can review sensor data of robot 200 and/or other data to determine if the error and/or assist event has been resolved. As another example, external sources can include other sensors. By way of illustration, robot 200 can be operating in view of other sensors such as cameras (e.g., security cameras, thermal cameras, closed-circuit television cameras, and/or other cameras), motion detectors, microphones, internet-of-things devices, and/or other sensors. These sensors can provide additional information that might not be picked up by the sensors of robot 200. Advantageously, such external sources can be present in the environment in which robot 200 is operating anyways. Accordingly, the external sources may not require additional installation, costs, resources, etc.

Figure 7:
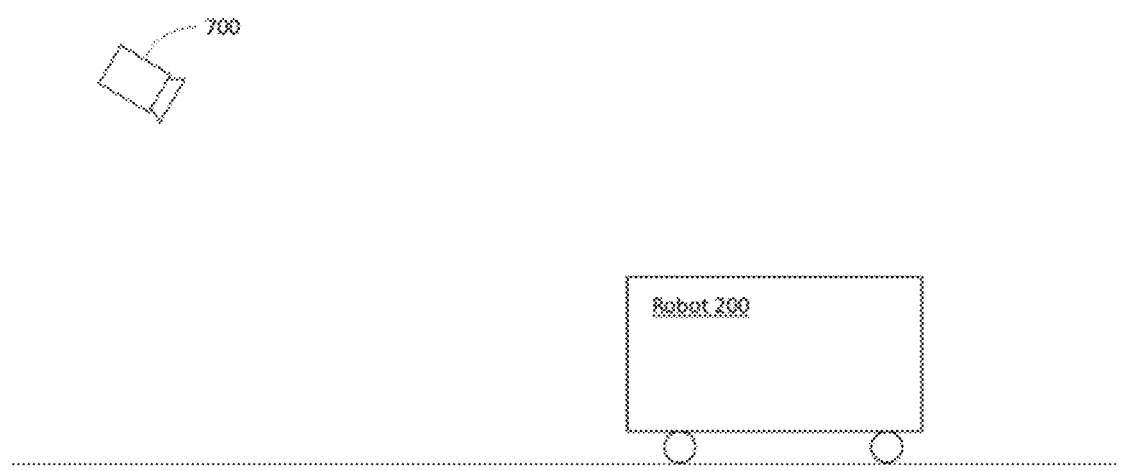
FIG. 7 is a side view of an external sensor for providing information about a robot in accordance with some implementations of the present disclosure.

FIG. 7 is a side view of external sensor 700 providing information on robot 200 in accordance with some implementations of the present disclosure. As illustrated, one external sensor, external sensor 700, is shown. However, in some implementations, a plurality of external sensors can be positioned around robot 200.

In some implementations, to determine if an error and/or assist event has been resolved, the data from an external sensor can be used. In some implementations, sensors in an environment can be pre-registered and/or predefined. For example, robot 200 and/or a remote network 402 can have a list (e.g., stored in memory) of external sensors in an environment of robot 200. When robot is determining if the error and/or assist event has been resolved, robot 200 and/or remote network 402 can send a signal to one or more external sensors on the list. For example, the signal can be a command (e.g., to send data), interrogatory, query, and/or other signal to have an external sensor (e.g., external sensor 700) send sensor data. In some cases, the list can be updated by the proximity of robot 200 to the external sensors. For example, robot 200 can send a signal with predetermined range, such as BLUETOOTH, radio frequency, near-field communication, and/or other forms of wireless communication to external sensors within range of such signal. Advantageously, if the external sensors are in range of such signal, there is an increased probability that robot 200 is within view of the external sensors.

In some implementations, external sensors can recognize robot 200. For example, a camera can have recognition software configured to identify robot 200. When the external sensors detect robot 200 has stopped for an error and/or assist event, the external sensors can push data to robot 200 and/or remote network 402. To aid the recognition software, robot 200 can have further indications that robot 200 has an error and/or assist event. For example, robot 200 can have a light that turns on with predetermined characteristics (e.g., turn/off frequency, color, intensity, etc.), a screen display, heat signature, sound, and/or other indicia that would be observable by the modality of the external sensor when robot 200 has an error and/or assist request. Advantageously, robot 200 would have externally observable indicia of an error and/or assist event to inform operators in the vicinity of robot 200 that an error and/or assist event has occurred.

The external sensors can also detect the presence of errors and/or assist events by recognizing patterns in sensor data. For example, the external sensors can detect obstacles, spills, internal errors, fatal errors, failure of the robot to proceed with tasks, a robot getting stuck, and/or any other event that can give rise to an error and/or assist event in substantially similar ways as described relating to sensors unit 312 of robot 200, wherein the sensor is instead an external sensor. By way of illustration, where an external sensor is a camera, the sensor data from the external sensor can be processed by the external sensor, robot 200, and/or remote network 402. Accordingly, the external sensor, robot 200, and/or remote network 402 can detect the presence of errors and/or assist events by identifying predetermined patterns in the sensor data. By way of illustration, a thermal camera can detect spills and determine if a spill is present in the field of view of the external sensor. As another illustration, the camera can detect an obstacle in front of robot 200 and determine if the obstacle has moved. As another illustration, the camera can detect the position of robot 200 and determine if robot 200 has moved. Movement of robot 200 can be indicative at least in part that robot 200 has been assisted and/or the error has been resolved.

In some implementations, when robot 200 receives sensor information that indicates an error and/or assist event from an external sensor, it can determine that an error and/or assist event has not been resolved. For example, where the external sensor is configured to push information to robot 200 and/or remote network 402 when there is an error and/or assist event, the fact that robot 200 has received sensor information from the external sensor can be indicative in part that the error and/or assist event has not been resolved.

If robot 200 determines that the error and/or assist event has been resolved, robot 200 can continue operation, as illustrated in block 508. Continuing operation can include performing a task that robot 200 had been performing and/or is supposed to perform. Continuing operation can also normal operation of robot 200. In some cases, robot 200 can receive additional maintenance, repair, and/or assistance to more fully resolve an error and/or assist event. As a result, continued operation can include continued operation of robot 200 with impaired functionality. In some cases, robot 200 can be operated to receive additional maintenance, repair, and/or assistance, such as by causing robot 200 to move to a repair center. In some cases, robot 200 can perform an initialization before continuing operation. For example, robot 200 can be moved by an operator and can re-localization using mapping and localization unit 324. Robot 200 can also recalibrate its sensors and/or perform a status check in order to determine the status of one or more components and/or the entirety of robot 200 before proceeding with operations.

Where in block 506, robot 200 determines that an error and/or assist event has not been resolved, block 510 can be performed. Block 510 can include attempting to address the error and/or assist event and determining if the error and/or assist event has been addressed. The attempt to address the error and/or assist event can occur after a predetermined delay relative to block 506 and/or block 504. Advantageously, such a delay can give time for the error and/or assist event to be addressed (e.g., by an operator and/or remote network 402). In some cases, such a delay can allow resources of robot 200 to not be expended if the error and/or assist event is already being addressed. Moreover, attempting to address the error and/or assist event can, in some cases, interfere with attempts by operators to address the error and/or assist event.

In some implementations, the predetermined delay can be determined based at least in part on one or more of: how much time it takes to address an error and/or assist event, empirical evidence of how long it takes for an operator to receive an alert, changes in circumstances as detected by sensors unit 312, changes in circumstances as detected by external sensors, consequences of down time (e.g., loss of user/operator confidence), and/or other factors. In some cases, the predetermined delay can be as short as a few seconds, such as 1, 2, 3, 4, 5, 6, 7, 8, 9, 10 or more seconds. In some cases, the predetermined delay can be longer, such as in the order of minutes or hours.

In some implementations, block 510 can include displaying display 600 for user input. In some implementations, display 600 in FIG. 6A-6C can be dynamic. For example, display 600 can be an assist view where an operator of robot 200 can send commands to robot 200. For example, the operator can select the path robot 200 should take. As another illustration, a user can select path 610 on display 600 to tell robot 200 to return and/or proceed on path 610. In some implementations, a user can illustrate to robot 200 where to go, such as by inputting a new path (e.g., drawing on a touch screen and/or any other way of input into display 600). As another illustration, a user can press a button telling robot 200 to proceed.

In some cases, the availability of a plurality of paths to travel can lead to an error and/or assist event. For example, robot 200 can take multiple passes through a substantially similar area, creating a plurality of paths. In some cases, robot 200 can have difficulty determining which of the paths robot 200 should take. An operator can then select the appropriate path from the plurality of paths presented.

In some implementations, the plurality of paths can appear on display 600, such as a plurality of paths substantially similar to path 610. An operator can then select the desired path for robot 200 to take. In some cases, instead of paths, positions, locations, poses, orientations, etc. can be displayed on display 600 for selection. In some implementations, an operator can input a path, such as by drawing in a path with a touch screen and/or other input mechanism (e.g., of user interface unit 318).

In some implementations, the paths displayed on display 600 can be determined by through training and/or user input. For example, an operator can manually input alternative routes to any given path, location, pose, position, orientation, etc. In some implementations, such alternatives can be generated automatically, such as by determining one or more paths, locations, poses, positions, orientations, etc. that robot 200 could travel, and making those selectable. In some cases, of the alternatives, robot 200 can randomly select a predetermined number to display. In some cases, robot 200 can select which alternatives to display based at least in part on the frequency a path is travelled (e.g., for general navigation, it might be assumed a more travelled path is more likely to be picked; however, in some applications, such as floor cleaning, where untraveled paths are desired, a less travelled path can be picked), a predetermined preference, random generation, statistical probabilities, and/or any other method.

In some implementations, block 510 can include a recovery by robot 200, wherein robot 200 attempts to resolve the issue. For example, robot 200 can actuate one or more actuators of actuators unit 320 in order to address the error and/or assist event. By way of illustration, in some cases, an error and/or assist event can be the result of noise in one or more sensors. In some cases, the noise can have the appearance of an obstacle and cause robot 200 to mistakenly believe the obstacle is preventing it from performing a task. Robot 200 can then make a small movement, such as turning, moving forward, moving backwards, and/or other movements. Such movements can, in some cases, allow robot 200 to determine that the detection of the obstacle was due to noise and resolve the error and/or assist event (and/or consider the error and/or assist event addressed). In some cases, robot 200 can reboot, calibrate, re-localization, and/or perform processes to reset errors in the workings of robot 200.

If the error and/or assist event (and/or a user is able to address an error and/or assist event) has been addressed, then robot 200 can continue operation in block 508. Advantageously, where robot 200 can address the error and/or assist event, robot 200 can continue operation with little to no operator input, potentially creating a better user experience.

If the error and/or assist event has not been addressed, robot 200 can generate an alert about the error and/or assist event in block 504. Advantageously, the alert can remind the operator/user that assistance is needed. In some applications, a predetermined delay can be implemented. Advantageously, the predetermined alert can allow time for the error and/or assist event to be addressed. In some implementations, the predetermined delay can be determined by one or more: the time it takes for an error and/or assist event to resolve (e.g., the process robot 200 would take and/or a user would take), empirical data on addressing error and/or assist events, the speed in which the environment of robot 200 changes, safety concerns, and other factors. By way of example, in some implementations, the delay can be 30, 60, 90, 120, or more seconds.

Figure 8:
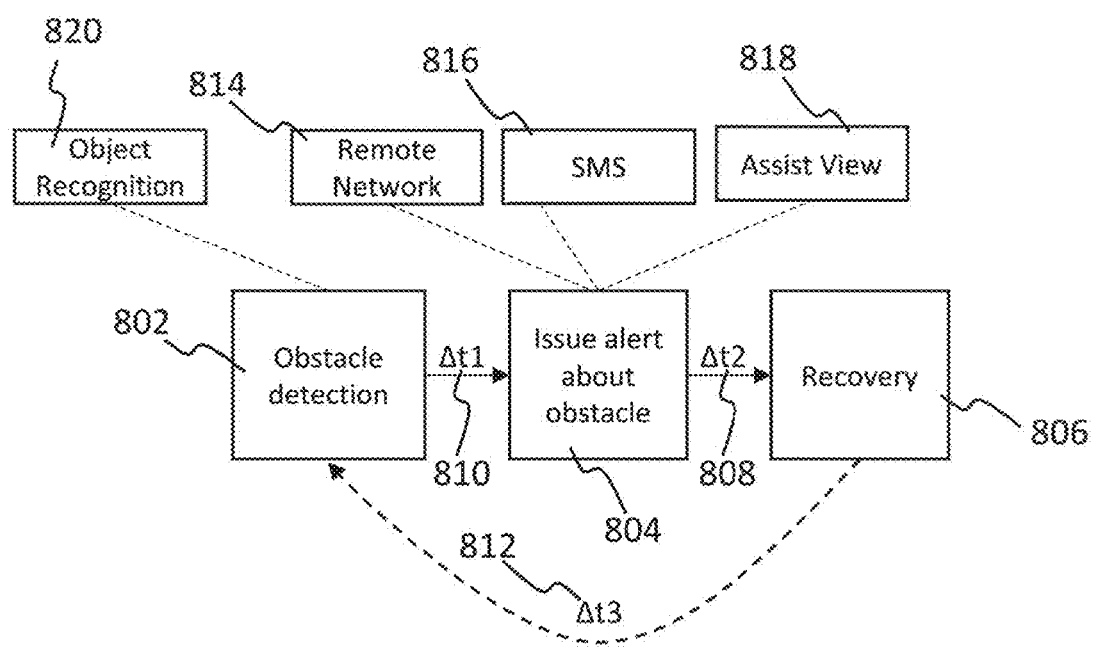
FIG. 8 is a functional block diagram illustrating an assist process in accordance with some implementations of the present disclosure.

FIG. 8 is a functional block diagram illustrating an assist process in accordance with some implementations of the present disclosure. Block 802 includes obstacle detection. In some implementations, obstacle detection can be performed by one or more sensors of sensors unit 312. By way of illustration, a sensor can detect an obstruction in the path of robot 200 as it is travelling. The obstruction can appear as a solid item along the trajectory of robot 200. In some implementations, using one or more sensors of sensors unit 312, robot 200 can identify the obstacle through block 820, which includes object recognition. Object recognition can include machine learning to associate data from one or more sensors of sensors unit 312 with identifications of objects.

After predetermined time delay 810, robot 200 can issue an alert about the obstacle in accordance with block 804. The predetermined time delay 810 can be substantially similar to the window of time described with reference to block 502. Advantageously, predetermined time delay 810 can allow the obstacle to move away and/or resolve itself before robot 200 issues an alert about it.

The alert issued in block 804 can include an alert to remote network 814, via SMS 816, and/or in assist view 818. Assist view 818 can include systems and methods for displaying the alert and/or receiving commands, such as display 600.

After predetermined time delay 808, robot 200 can attempt to recover in block 806. Predetermined time delay 808 can be substantially similar to the predetermined delay discussed with reference to block 506. Advantageously, predetermined time delay 808 can also allow time for the obstacle to clear and/or robot 200 to be otherwise assisted. Recovery can include operator assistance or actions taken by robot 200, such as with actions substantially similar to those described with reference to block 510.

If robot 200 is unable to recover in block 806, the process can return to block 802 again after time delay 812. Advantageously, time delay 812 can give time for robot 200 to recover in block 806. In some implementations, the time delay 812 can be determined by one or more: the time it takes for an error and/or assist event to resolve (e.g., the process robot 200 would take and/or a user would take), empirical data on addressing error and/or assist events, the speed in which the environment of robot 200 changes, safety concerns, and other factors. By way of example, in some implementations, the delay can be 30, 60, 90, 120, or more seconds.

Figure 9:
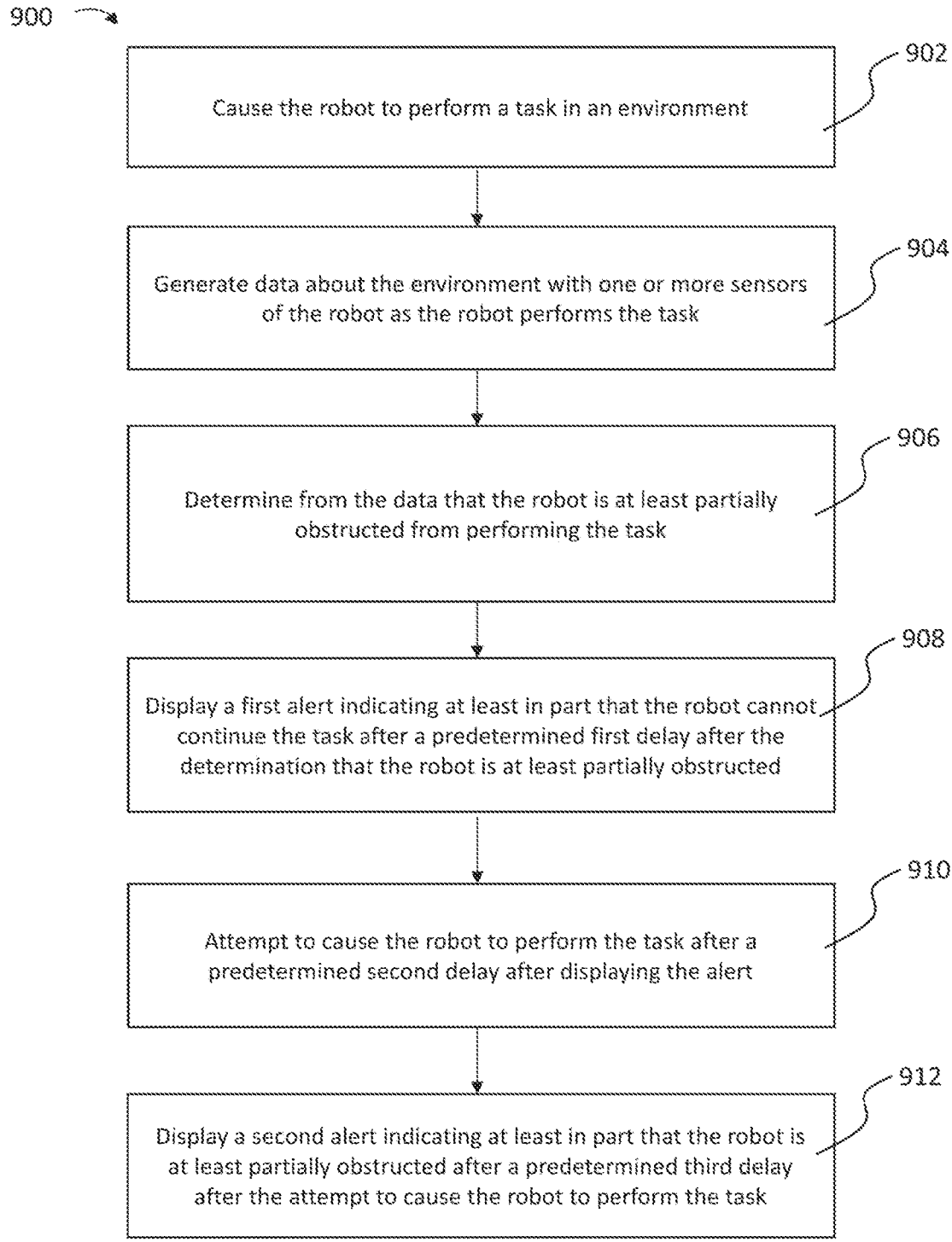
FIG. 9 is a process flow diagram of an exemplary method for operation of a robot in accordance with some implementations of this disclosure.

FIG. 9 is a process flow diagram of an exemplary method 900 for operation of a robot in accordance with some implementations of this disclosure. Block 902 includes causing the robot to perform a task in an environment. Block 904 includes generating data about the environment with one or more sensors of the robot as the robot performs the task. Block 906 includes determining from the data that the robot is at least partially obstructed from performing the task. Block 908 includes displaying a first alert indicating at least in part that the robot cannot continue the task after a predetermined first delay after the determination that the robot is at least partially obstructed. Block 910 includes attempting to cause the robot to perform the task after a predetermined second delay after displaying the alert. Block 912 includes displaying a second alert indicating at least in part that the robot is at least partially obstructed after a predetermined third delay after the attempting to cause the robot to perform the task.

Figure 10:
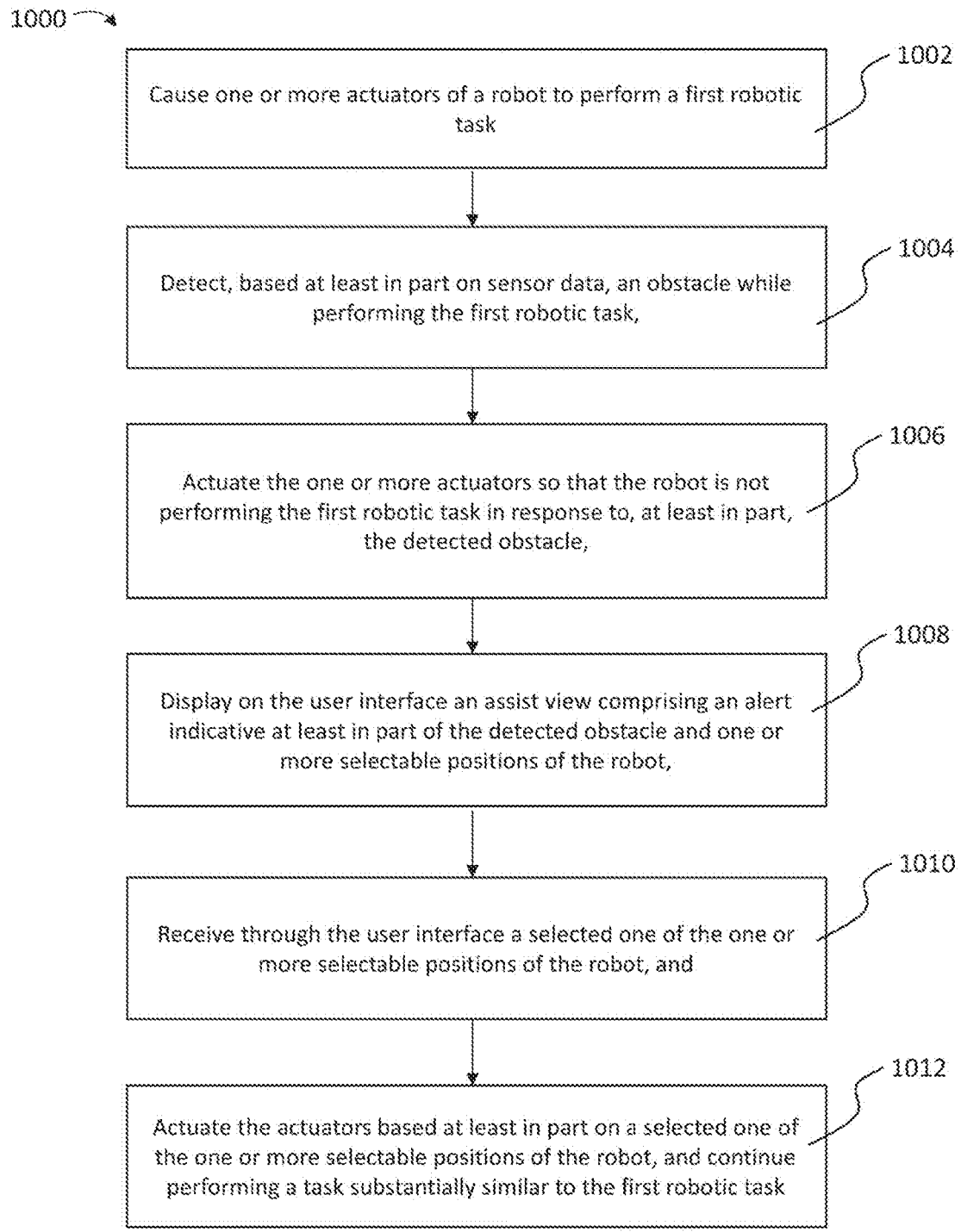
FIG. 10 is a process flow diagram of an exemplary method for operation of a robot in accordance with some implementations of this disclosure.

FIG. 10 is a process flow diagram of an exemplary method 1000 for operation of a robot in accordance with some implementations of this disclosure. Block 1002 includes causing one or more actuators of a robot to perform a first robotic task. Block 1004 includes detecting, based at least in part on sensor data, an obstacle while performing the first robotic task. Block 1006 includes actuating the one or more actuators so that the robot is not performing the first robotic task in response to, at least in part, the detected obstacle. Block 1008 includes displaying on the user interface an assist view comprising an alert indicative at least in part of the detected obstacle and one or more selectable positions of the robot. Block 1010 includes receiving through the user interface a selected one of the one or more selectable positions of the robot. Block 1012 includes actuating the actuators based at least in part on a selected one of the one or more selectable positions of the robot, and continue performing a task substantially similar to the first robotic task.

Figure 11:
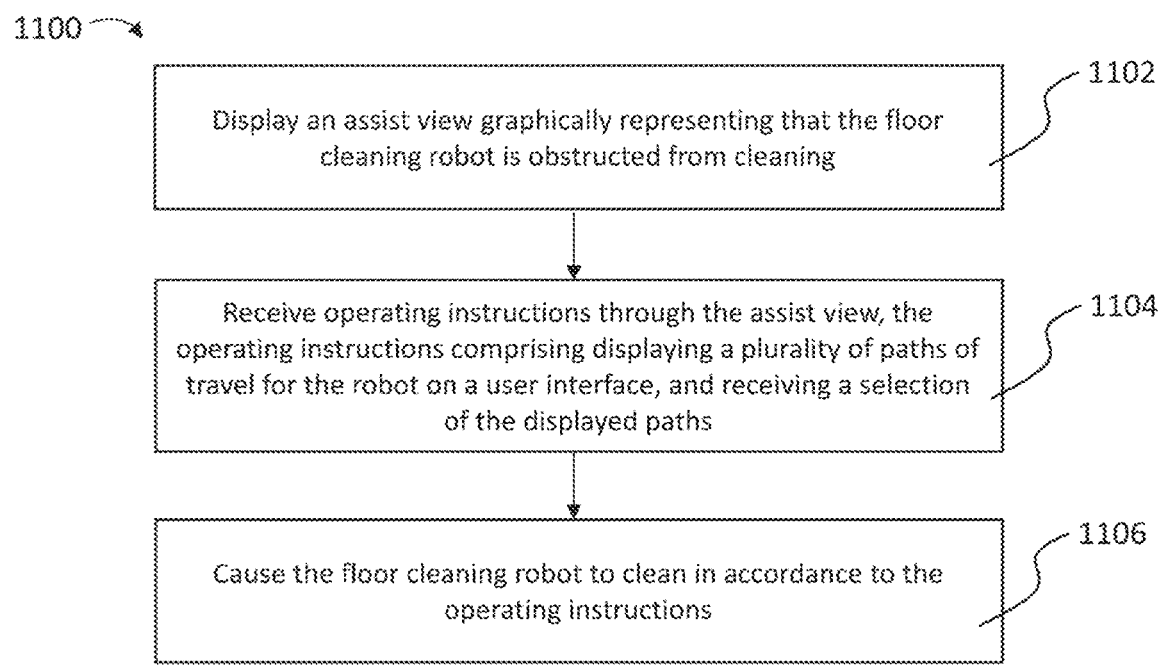
FIG. 11 is a process flow diagram of an exemplary method for assisting a robot in accordance with some implementations of this disclosure.

FIG. 11 is a process flow diagram of an exemplary method 1100 for assisting a robot in accordance with some implementations of this disclosure. Block 1102 includes displaying an assist view graphically representing that the floor cleaning robot is obstructed from cleaning. Block 1104 includes receiving operating instructions through the assist view, the operating instructions comprising displaying a plurality of paths of travel for the robot on a user interface, and receiving a selection of the displayed paths. Block 1106 includes causing the floor cleaning robot to clean in accordance to the operating instructions.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software can include any sequence or human or machine cognizable steps which perform a function. Such computer program and/or software can be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless can include a causal link between any two or more entities (whether physical or logical/virtual), which enables information exchange between the entities.

It will be recognized that while certain aspects of the disclosure are described in terms of a specific sequence of steps of a method, these descriptions are only illustrative of the broader methods of the disclosure, and can be modified as required by the particular application. Certain steps can be rendered unnecessary or optional under certain circumstances. Additionally, certain steps or functionality can be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated can be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations can be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that can be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A method for operating a robot, comprising:
   causing the robot to perform a first task in an environment;
   detecting an assist event based on, at least in part data from one or more sensors coupled to the robot;
   waiting, for a first time delay, for the assist event to be addressed by transmitting a signal to at least one actuator to halt performance of the first task;
   attempting, for a second time delay, to autonomously address the assist event by activating at least one actuator to perform a recovery if the assist event is not addressed within the first time delay, the second time delay being subsequent to the first time delay;
   determining a first alert if the assist event is still not addressed after the second time delay, wherein the first alert comprises a request for assistance from one or more human operators of the robot and indicates, at least in part, an error that has occurred with data indicative of a reason for the error occurring;
   communicating the first alert to a server in order to cause the server to provide the first alert to an access point for the one or more human operators, the access point comprising a device separate from the robot, the access point displays an assist view indicating the robot is at least in part obstructed from completing the first task, the assist view is transmitted to the access point via the server and is configured to allow an operator of the robot to send the operating instructions to the robot; and
   receiving operating instructions from the access point via the server from the one or more human operators to address the assist event.

2. The method of claim 1, further comprising:
   detecting the assist event based on detection of at least one of an object, obstacle, false positive, or internal characteristics of the robot obstructing completion of the first task.

3. The method of claim 1, wherein
   the first alert comprises an SMS notification to the one or more human operators of the robot, the access point comprises a mobile device of the human operator which receives the SMS notification,
   the first task comprises navigating the robot on a floor, and
   the assist event is detected based on an object which, at least in part, obstructs the navigation of the robot on the floor.

4. The method of claim 1, further comprising:
   addressing the assist event by a human operator pressing a button coupled to the robot to configure the robot to continue the first task; and
   performing the recovery by transmitting the signal to one or more actuators to address the assist event.

5. The method of claim 1 wherein
   the first alert comprises information indicative at least in part of a detected obstacle and one or more selectable positions of the robot; and
   the operating instructions comprise at least in part a selected one of the one or more selectable positions of the robot; and
   the method further comprises
   actuating actuators based at least in part on the selected one of the one or more selectable positions of the robot; and
   performing a second task modified from the first task based at least in part on the selected one of the one or more selectable positions of the robot.

6. A robotic system, comprising:
   a memory comprising computer readable instructions stored thereon; and
   at least one processing device configurable to execute the computer readable instructions to:

cause the robotic system to perform a task in an environment;
detect an assist event based on, at least in part, data from one or more sensors coupled to the robotic system;
wait, for a first time delay, for the assist event to be addressed by transmitting a signal to at least one actuator to halt performance of the first task;
attempt, for a second time delay, to autonomously address the assist event by activating at least one actuator to perform a recovery if the assist event is not addressed within the first time delay, the second time delay being subsequent to the first time delay;
determine a first alert if the assist event is still not addressed after the second time delay, wherein the first alert comprises a request for assistance from one or more human operators of the robot and indicates, at least in part, an error that has occurred with data indicative of a reason for the error occurring;
communicating the first alert to a server in order to cause the server to provide the first alert to an access point for the one or more human operators, the access point comprising a device separate from the robot, the access point displays an assist view indicating the robot is at least in part obstructed from completing the first task, the assist view is transmitted to the access point via the server and is configured to allow an operator of the robot to send the operating instructions to the robot; and
receive operating instructions from the access point via the server from the one or more human operators to address the assist event.

7. The system of claim 6, wherein the at least one processing device is further configurable to execute the computer readable instructions to
detect the assist event based on detection of at least one of an object, obstacle, false positive, or internal characteristics of the robotic system obstructing completion of the first task.

8. The system of claim 6, wherein
the first alert comprises an SMS notification to the one or more human operators of the robotic system, the access point comprises a mobile device of the human operator which receives the SMS notification, the SMS notification comprising, at least in part, data indicative of a reason for the error occurring.

9. The system of claim 6, wherein
the first task comprises navigating on a floor; and
the assist event is detected based on an object which, at least in part, obstructs the navigation on the floor by the robotic system.

10. The system of claim 6, wherein the at least one processing device is further configurable to execute the computer readable instructions to
continue the first task by the robotic system after receiving at least one input from a human operator in response to the assist event, the at least one input corresponds to the human operator pressing a button coupled to the robotic system.

11. The system of claim 6 wherein
the first alert comprises information indicative at least in part of a detected obstacle and one or more selectable positions of the robot; and
the operating instructions comprise at least in part a selected one of the one or more selectable positions of the robot;
wherein the at least one processing device is further configurable to execute the computer readable instructions to
actuate actuators based at least in part on the selected one of the one or more selectable positions of the robot; and
perform a second task modified from the first task based at least in part on the selected one of the one or more selectable positions of the robot.

12. A non-transitory computer readable storage apparatus comprising a plurality of instructions stored therein, that when executed by at least one processing device, configure the at least one processing device to,
cause a robot to perform a first task in an environment;
detect an assist event based on, at least in part, data from one or more sensors coupled to the robot;
wait, for a first time delay, for the assist event to be addressed by transmitting a signal to at least one actuator to halt performance of the task;
attempt, for a second time delay, to autonomously address the assist event by transmitting the signal to at least one actuator to perform a recovery if the assist event is not addressed within the first time delay, the second time delay being subsequent to the first time delay;
determine a first alert if the assist event is still not addressed after the second time delay, wherein the first alert comprises a request for assistance from one or more human operators of the robot and indicates, at least in part, an error that has occurred with data indicative of a reason for the error occurring;
communicating the first alert to a server in order to cause the server to provide the first alert to an access point for the one or more human operators, the access point comprising a separate device than the robot, the access point displays an assist view indicating the robot is at least in part obstructed from completing the first task, the assist view is transmitted to the access point via the server and is configured to allow an operator of the robot to send the operating instructions to the robot; and
receive operating instructions from the access point via the server from the one or more human operators to address the assist event.

13. The non-transitory computer readable storage apparatus of claim 12, wherein the at least one processing device is further configurable to execute the plurality of instructions to
detect the assist event based on detection of at least one of an object, obstacle, false positive, or internal characteristics of the robot obstructing completion of the task.

14. The non-transitory computer readable storage apparatus of claim 13, wherein the second alert corresponds to the robot unable to perform the first task after a third time delay subsequent to the second time delay and in response to the continued detection of the assist event.

15. The non-transitory computer readable storage apparatus of claim 12, wherein
the first alert comprises an SMS notification to the one or more human operators of the robot, the access point comprises a mobile device of the human operator which receives the SMS notification.

16. The non-transitory computer readable storage apparatus of claim 12, wherein the first task comprises navigating on a floor; and
the assist event is detected based on an object which, at least in part, obstructs the navigation on the floor by the robot.

17. The non-transitory computer readable storage apparatus of claim 12, wherein the at least one processing device is further configurable to execute the plurality of instructions to continue the first task by the robot after receiving at least one input from a human operator in response to the assist event, the at least one input corresponds to the human operator pressing a button.

18. The non-transitory computer readable storage apparatus of claim 12, wherein the first alert comprises information indicative at least in part of a detected obstacle and one or more selectable positions of the robot; and the operating instructions comprise at least in part a selected one of the one or more selectable positions of the robot;

wherein the at least one processing device is further configurable to execute the computer readable instructions to actuate actuators based at least in part on the selected one of the one or more selectable positions of the robot; and perform a second task modified from the first task based at least in part on the selected one of the one or more selectable positions of the robot.

\* \* \* \* \*